US011330397B2

(12) United States Patent
Antony et al.

(10) Patent No.: US 11,330,397 B2
(45) Date of Patent: May 10, 2022

(54) SYSTEM FOR CONTINUOUSLY DETERMINING LOCATION OF ELECTRONIC TAGS WITH METHODS TO ACHIEVE LOW POWER CONSUMPTION

(71) Applicant: TraceSafe Technologies, Inc., Reno, NV (US)

(72) Inventors: Francis Antony, Reno, NV (US); Suresh Singamsetty, Reno, NV (US); Dennis Ching Chung Kwan, Reno, NV (US); Sujith Balakrishnan, Kochi (IN); Manu Velayudhan, Kochi (IN)

(73) Assignee: TraceSafe Technologies, Inc., Reno, NV (US)

( * ) Notice: Subject to any disclaimer, the term of this patent is extended or adjusted under 35 U.S.C. 154(b) by 0 days.

(21) Appl. No.: 17/202,027

(22) Filed: Mar. 15, 2021

(65) Prior Publication Data

US 2021/0289319 A1 Sep. 16, 2021

Related U.S. Application Data

(60) Provisional application No. 63/015,231, filed on Apr. 24, 2020, provisional application No. 62/989,504, filed on Mar. 13, 2020.

(51) Int. Cl.
| | | |
|---|---|---|
| *H04W 4/02* | (2018.01) | |
| *H04B 17/318* | (2015.01) | |
| *H04L 41/0803* | (2022.01) | |
| *H04W 4/80* | (2018.01) | |
| *H04W 4/029* | (2018.01) | |
| *G06F 8/65* | (2018.01) | |
| *H04W 52/02* | (2009.01) | |
| *G08B 13/12* | (2006.01) | |
| *G08B 7/06* | (2006.01) | |

(Continued)

(52) U.S. Cl.
CPC .............. *H04W 4/023* (2013.01); *G06F 8/65* (2013.01); *G06K 19/0723* (2013.01); *G08B 7/06* (2013.01); *G08B 13/12* (2013.01); *H04B 17/318* (2015.01); *H04L 5/0048* (2013.01); *H04L 41/0803* (2013.01); *H04W 4/029* (2018.02); *H04W 4/80* (2018.02); *H04W 52/0209* (2013.01)

(58) Field of Classification Search
CPC ....... H04W 4/023; H04W 4/029; H04W 4/80; H04W 52/0209; H04B 17/318; G06F 8/65; G06K 19/0723; G08B 7/06; G08B 13/12; H04L 5/0048; H04L 41/0803
See application file for complete search history.

(56) References Cited

U.S. PATENT DOCUMENTS

2017/0124366 A1* 5/2017 Good .................... G01S 5/0289

\* cited by examiner

*Primary Examiner* — Curtis B Odom
(74) *Attorney, Agent, or Firm* — Rowan TELS LLC

(57) ABSTRACT

A position tracking system for Tags to collect relative proximity to other Tags using received signal strength, with methods to reduce power consumption with controlled degradation in overall system performance such as location accuracy and frequency of location updates. Configurable parameters for control of tag functions facilitate performance tradeoffs against application requirements. System architecture using mobile phone and gateway for uploading data enables efficient upload of tag data without user intervention. Applications of the disclosure include self-quarantine, contact tracing, mother-infant pairing, location history tracking, and personnel-asset usage monitoring.

30 Claims, 23 Drawing Sheets

(51) Int. Cl.
*G06K 19/07* (2006.01)
*H04L 5/00* (2006.01)

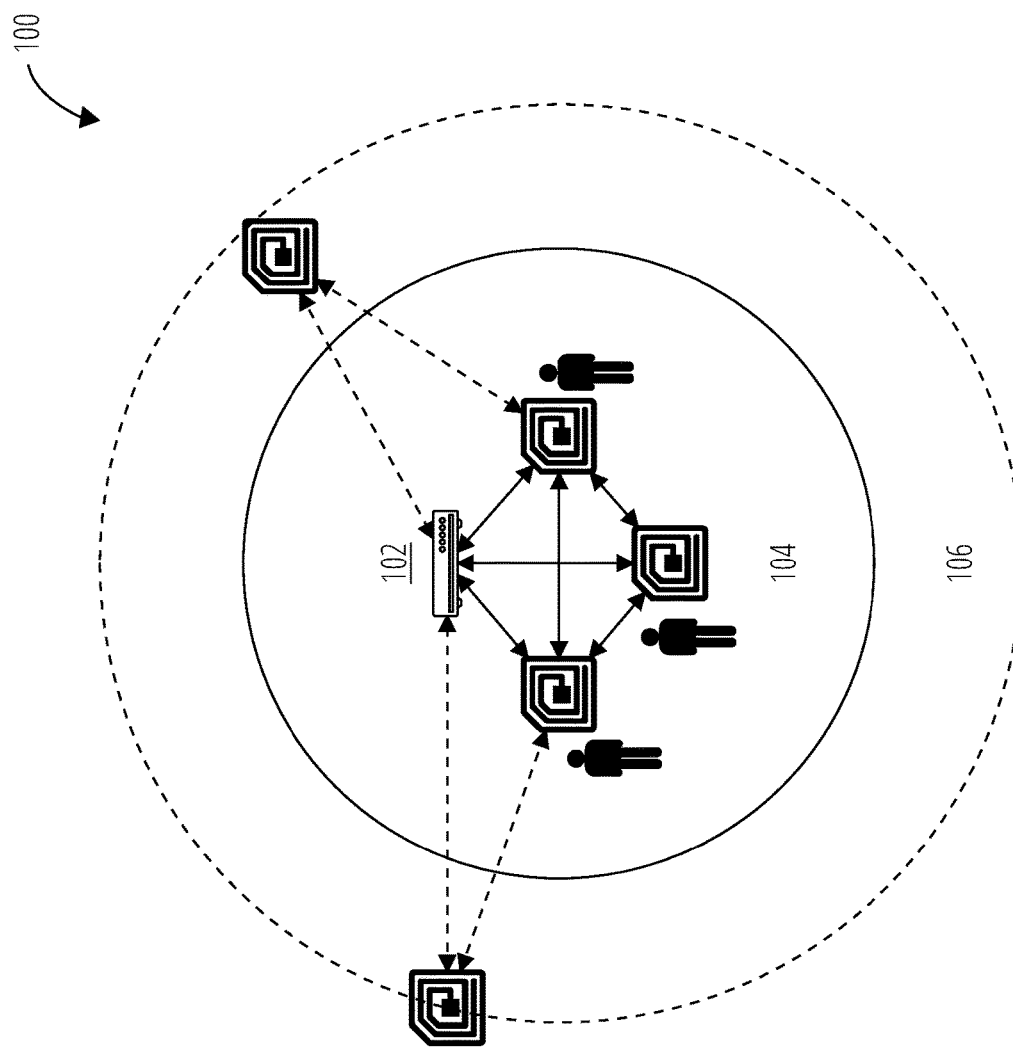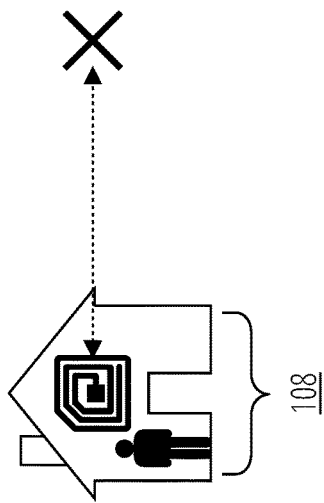
FIG. 1

# US 11,330,397 B2

SYSTEM FOR CONTINUOUSLY DETERMINING LOCATION OF ELECTRONIC TAGS WITH METHODS TO ACHIEVE LOW POWER CONSUMPTION

CROSS-REFERENCE TO RELATED APPLICATIONS

This application claims the benefit of U.S. provisional application Ser. No. 63/015,231, titled "SYSTEM FOR CONTINUOUSLY DETERMINING LOCATION OF ELECTRONIC TAGS WITH METHODS TO ACHIEVE LOW POWER CONSUMPTION", filed on Apr. 24, 2020, and claims the benefit of U.S. provisional application Ser. No. 62/989,504, titled "SYSTEM FOR CONTINUOUSLY DETERMINING LOCATION OF ELECTRONIC TAGS WITH METHODS TO ACHIEVE LOW POWER CONSUMPTION", filed on Mar. 13, 2020, each of which is incorporated herein by reference in its entirety.

TECHNICAL FIELD

The present disclosure generally relates to electronic transceiver tags, and more particularly, to tracking the proximity of electronic tags either operating independently to broadcast wirelessly its own presence, and/or detect the presence of other tags by receiving their wireless transmissions. The electronic tags may also operate within an infrastructure such as a mesh network with which the tags communicate wirelessly and that their location may be tracked in real time. The electronic tags may be dedicated hardware devices for these purposes, or they may take the form of software applications running on mobile devices. Dedicated tags may interoperate with software applications running in the foreground or background, or they may send beacon signals that trigger actions using mechanisms that are native to the mobile device's operating systems, such as iOS and Android. In this case the software application may be invoked to operate upon receipt of such beacon signals, and the applications do not need to be running in the foreground or background at all.

The tracking system also consist of mobile devices, such as mobile phones, which may be used for multiple purposes including the initial registration of the tag to the system, to relay data stored in the tags to remote computers, and to run dedicated software applications to function as tags themselves. The mobile devices may relay data in real time, or may be used when a tag's stored data is to be uploaded to the remote computer in a non-real time manner.

Whether implemented as dedicated electronic tags or using mobile devices, there is significant power consumption due to the need to continuously receive from the tags in order to provide continuous monitoring. The present disclosure pertains also to methods that may be employed to achieve such functional objectives with significantly reduced power consumption.

BACKGROUND

Electronic tags are often used in tracking of goods, personnel, vehicles and many other objects which for convenience will be referred to as "assets" in the subsequent description. Conventional technologies allow for the location of such assets to be approximated, within a predetermined area, by having specific access points triangulate the received signal strength indicator (RSSI) of electronic signals emitted from the electronic tags attached to said assets. While this technique works well for detecting the presence of an asset within a predetermined area it is not well suited for determining the location and relative proximity between two assets and thus two electronic tags, which may be in locations where such access points are not deployed. In other words, there is no tracking solution to efficiently address the proximity of two tags relative to each other without deploying an infrastructure, which increases the costs of deployment and severely restricting the use of such tags in areas where such infrastructure exists.

For example, in hospitals settings, detection of any errors in mother-infant pairing may be achieved by tags worn by the mother and infant, by virtue of their proximity.

For another example, in a self-quarantine setting, a subject under self-quarantine may be monitored by a wristband that acts as a tag, and a mobile device that acts as the other tag. The mobile device reports its proximity with the wristband as well as its own GPS location to a remote monitoring station, which may then determine that the subject under self-quarantine is present at the desired quarantine location as reported by the mobile device. The location of the mobile device may further be determined by barometric sensor reading, as well as Wi-Fi network scanning, both of which are functions available in most mobile devices.

For a third example, in a contact-tracing setting, a tag worn by a user may transmit signals and also receive signals from other tags within the proximity determined by the RSSI as close contacts, and all signals received are recorded for the time and duration of contact. The recorded data may then be uploaded to a central computer where data analyses from other tags are combined to provide tracing of disease transmission routes. These results may then be used to help identify all individuals with high likelihood of infection, or to discover the original source of infection in a disease outbreak.

For a fourth example, conference attendees, conference exhibitors and staff may carry tags that both transmit and receive, so that all contact may thus be automatically logged for later use. Similarly there may be stationary tags in fixed locations, such as exhibition booths, where all attendees' presence and its duration may be logged, in both the attendees' tags as well as location tags. These logs may then be uploaded later from the tags for analysis of attendance to various locations and interactions between exhibitors and attendees.

BRIEF SUMMARY

In one aspect, a method includes transmitting from a transceiver tag a beacon signal, the beacon signal includes data packets including at least a device ID for the transceiver tag. The method also includes receiving at the transceiver tag, at least one received beacon signal from at least one of another transceiver tag, a transmitting tag, a gateway, a mobile device, and a static beacon. The method also includes maintaining a local real-time clock. A received signal strength indicator (RSSI) value is determined for the at least one received beacon signal. The transceiver tag is configured with tag operating parameters, the tag operating parameters configurable and including at least one of an advertising interval, a contact window, a scan period, a scan duty cycle, an RSSI filter threshold, and an RSSI contact threshold. The method also includes, on condition the RSSI value of the received beacon signal is below the RSSI filter threshold, ignoring the received beacon signal. The method further includes, on condition the RSSI value of the received beacon signal is at least the RSSI filter threshold, applying a smoothing filter to the RSSI value to create a smoothed RSSI value. The method additionally includes, on condition the smoothed RSSI value of the received beacon signal is at least the RSSI contact threshold creating an open contact record, the open contact record includes a received device ID from the data packets of the received beacon signal, the smoothed RSSI value of the received beacon signal, and a first time stamp based on the local real-time clock, and storing the open contact record in a local memory. The method also includes, on condition the smoothed RSSI value of the received beacon signal transitions from at least the RSSI contact threshold to below the RSSI contact threshold, adding a second time stamp, based on the local real-time clock, to the open contact record, and closing the open contact record to create a contact record. The method further includes uploading contact records from the transceiver tag to a cloud server. The method additionally includes storing the contact records on the cloud server. The method also includes analyzing the contact records on the cloud server.

In one aspect, a system includes a transceiver tag, a cloud server, and at least one of a gateway and a mobile device. The transceiver tag includes a transceiver, a battery, a processor, and a memory storing instructions that, when executed by the processor, configure the transceiver tag to execute the method indicated above.

BRIEF DESCRIPTION OF THE SEVERAL VIEWS OF THE DRAWINGS

In order that the advantages of certain embodiments of the disclosure will be readily understood, a more particular description of the disclosure briefly described above will be rendered by reference to specific embodiments that are illustrated in the appended drawings. While it should be understood that these drawings depict typical embodiments of the disclosure and are not therefore to be considered to be limiting of its scope, the disclosure will be described and explained with additional specificity and detail through the use of the accompanying drawings.

FIG. 1 illustrates power-saving via RSSI 100 in accordance with one embodiment.

DETAILED DESCRIPTION

Figure 2:
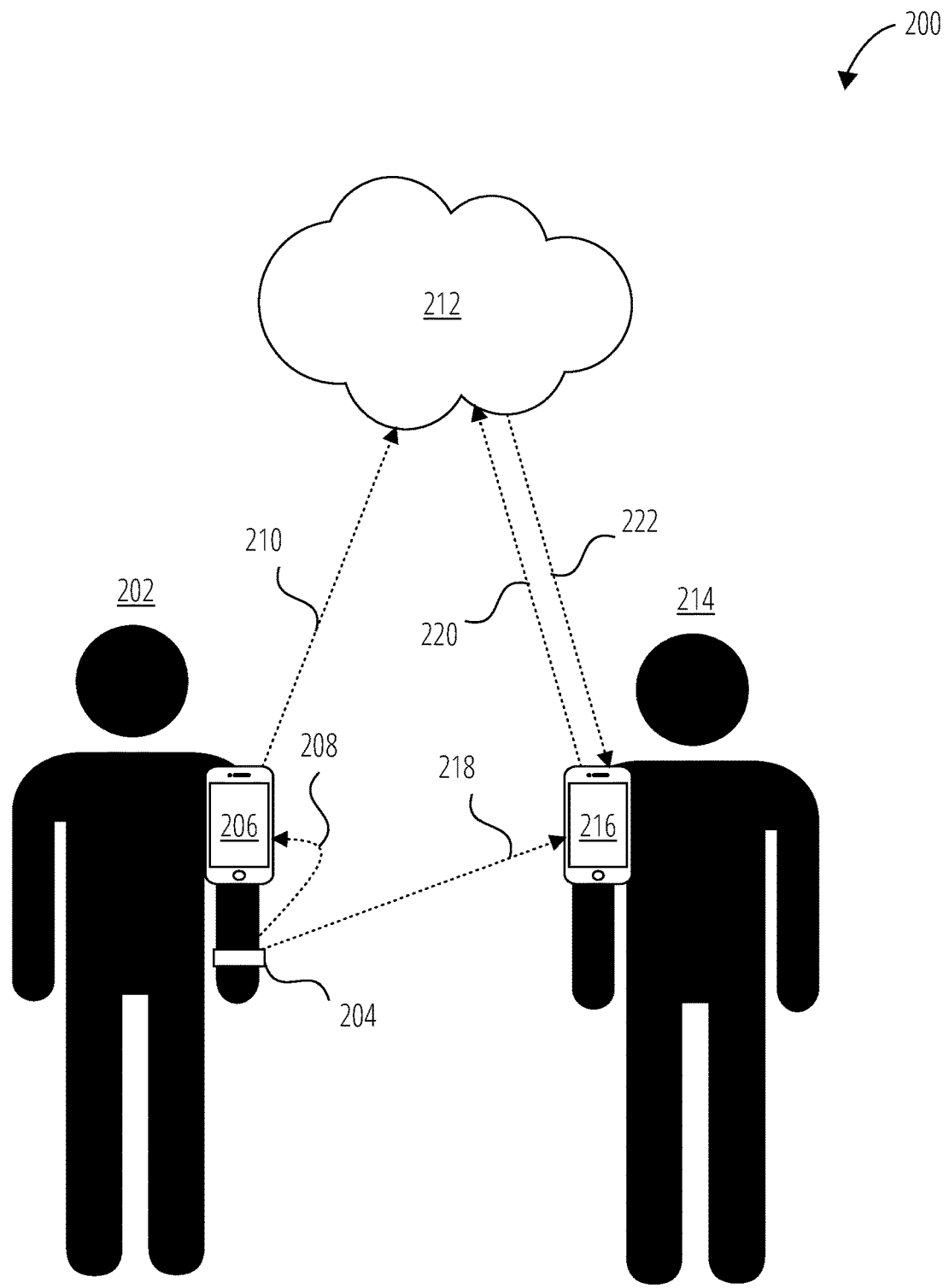
FIG. 2 illustrates a public health system 200 in accordance with one embodiment.

The present disclosure takes advantage of the communication features present at each node to determine a relative location of each said node. Certain embodiments of the present disclosure may provide solutions to the problems and needs in the art that have not yet been fully identified, appreciated, or solved by conventional electronic tag tracking systems.

For example, some embodiments of the present disclosure pertain to a low power robust hardware and software position tracking system that may be continuously receiving and recording signals from particular transmitting tags. Bluetooth Low Energy (BLE) protocol may be used as a means for such transmission in which case the signal may follow common BLE beacon format that may be detected and received by mobile devices' native operating systems, which triggers action by the software application.

A first embodiment pertains to the use of a wearable transmitting electronic tag, with a mobile device as a receiver, that monitors regularly the presence of the signal from the tag. The mobile device reports to a server over the internet any abnormal situation such as tag signals not received for a predetermined time duration. The mobile device also reports location information to the server in regular intervals, which includes one or more of the following: GPS coordinates, barometric pressure, WiFi network SSID, other devices connected to the WiFI network, WiFi network scanned, BLE devices scanned, gyroscope readings, and accelerometer readings.

The server may generate a notification to the mobile application running on the mobile device, requiring the user of the tag to confirm presence by taking action on the application such as hitting a button, at which time the application will sense the RSSI of the signal transmitted by the tag. The RSSI level is sent to the server which, based on the RSSI level, may determine the response is sent by the wearer of the tag or otherwise.

A specific implementation of this is in the iBeacon™ format used by iOS, in which iBeacon packets are recognized by the mobile device even with the software application not running either in background or foreground. The application may be invoked to run when iOS recognizes the iBeacon being received. The application may be invoked to run upon the said iBeacon when it is first recognized, being called the "beacon entry event". The application may also be invoked when the said iBeacon is not received for a certain time duration, being called the "beacon exit event". This time duration may be referred to as "exit time-out" in the subsequent description. In this case, in order for the tag to be continuously monitored and reported by the application, the tag will transmit iBeacon in bursts: with no transmissions in between two bursts for a time duration that is greater than exit time-out. This allows the application to be invoked at regular intervals and report tag presence, GPS location, and other relevant information such as barometric pressure to determine location.

The exit time-out is typically not publicly known, in which case as part of the process at or right after the initial activation of the tag, the beacon transmission may be stopped to generate an exit event, upon which the application sends the time duration from last beacon entry event to the tag, which may then schedule its beacon transmission to be spaced out longer than the exit time-out duration. This allows the tag also to reduce power consumption to the minimum possible and still have the mobile application reporting in regular intervals.

The mobile device application may send GPS location as well as other location-related information including but not limited to: barometric pressure, Wi-Fi networks scanned, Wi-Fi network connected, other devices in the Wi-Fi network, BLE beacons scanned, gyroscope and accelerometer data. These data may be used by the cloud server, for example in a self-quarantine application, to determine if the mobile device has changed locations.

The mobile device application may send notification to the cloud server when a tag signal is not received for a predetermined time duration. For example in a self-quarantine application, to signal an alert that the subject wearing a tag has left the location.

A second embodiment pertains to contact tracing scenario, whereby transmitting tags that may be transmit-only, receiving tags that are receive-only, and also transceiver tags that transmit and receive, are deployed to continuously record the proximity of tags relative to each other. Tags with receive functions record all transmitted data packets of a predetermined data pattern that may define them as being the same type, for example within the same company. Data recorded may then be transferred to a server connected via internet, either through fixed receiving devices that are placed as infrastructure in a location, or alternatively via a mobile device tracking application that connects to the tag and retrieves the recorded data. Data packets received provide information of all other tags within a preconfigured proximity as indicated by the RSSI of the data packets, and may then be used to trace close contacts between wearers of the tags.

A tag may also be implemented as a mobile phone software application, so that any combination of tags and mobile phones may fulfill the contact tracing functions as described above. In the case of the mobile phone being a tag, the received data packets from other tags may be relayed in real time to the cloud server for storage.

A tag may be fixed to a location in which case it may provide absolute location information as a transmitting tag to other receiving tags, or to receive from transmit-only tags to record the presence of such tags. A fixed location tag may also be a mesh node and participate to relay data packets to other mesh node devices, for example using Bluetooth Mesh.

There may be special control tags which are to disable and enable a normal contact tracing tag as needed when a tag is not in use, such as when a tag is stored at the reception of an office. The control tag may broadcast a beacon data packet that contains the control data for disable/enable operation, and the time duration of the operation. A tracking tag may then be disabled from operation for that period of time, during which it may cease all function and power down to extend battery life. Upon expiry of the configured time period, the tag may resume operation according to the existing parameters. For example, the time may be set to 3 minutes so that the tag may be become functional after 3 minutes of no longer receiving the disable beacon packets. A tag in this configuration may resume function automatically 3 minutes after leaving the reception area, for example.

Some embodiments of the present disclosure pertain to a robust hardware and software position tracking system that collects information and provides alerts with respect to the position of a non-listener tag versus a listener tag. For instance, the duration that a mother is proximate to an infant and the location of the mother and infant may be tracked in real time or near-real time. In some embodiments, the system may alert the mother in real time or near-real time regarding the location of the infant. Periodic alerts may be sent to nurses or other staff members regarding mother and infant bonding time. Communication may occur between two small, battery operated devices for the mother an infant. The infant tag may be smaller than the mother tag, and may not listen for other tags in some embodiments. However, use of smaller non-listener tags with listener tags may be applied to any suitable application and scenario without deviating from the scope of this disclosure.

Advantages of some embodiments include, but are not limited to, easy installation, high accuracy, small tag size, and/or low power consumption. In some embodiments, it is relatively easy to install the hardware and setup the environment with smartphone applications, for example. This may not require a high level of skill/expertise related to the technology. High accuracy may be provided as tags communicate. Listeners may gather data from the parent tag and distribute it to a cloud server, for example, for further analysis. The tags may also have a relatively small form factor. Both the mother and infant tags may be small and use a battery with button cells. Low power consumption may be achieved by using listeners with advanced Bluetooth™ Low Energy (BLE) technology and button cell tags, providing a longer operating life.

Another important parameter to be set to each tag is the real-time clock at the current time, which once set, may be kept updated by the tag itself. For low-cost implementation the real-time clock is implemented by software running on CPU with no power backup, and may be lost upon battery change for example. Two methods are described here for recovering real-time clock settings: using gateway broadcast, or via other tags with real-time sent as part of the beacon data packets. A tag that has an unsynchronized real-time clock, for whatever reason, may continue to function with all timestamps made relative to the unsynchronized start time. As the tag comes into contact with other tags, which most likely will be synchronized, it may update stored times relative to its current real-time all the way back to the start time. In effect, the real-time clock may be propagated through the tags broadcasting through their normal beacon data packets. The source of the real-time clock may ultimately be from tags being synchronized to gateways, which derive their time from the accurate internet time.

For mother-infant pairing verification, typical value for advertising interval is once per second in order to have long battery life for transmit-only infant wristbands which may use very small battery sizes, such as CR1225. In this case the mother wristband may have a 10% duty cycle and 12 seconds scan period for example, so that the 1.2 second scan window may capture at least a beacon packet from the infant wristband, which has high likelihood as the pairing detection is to detect close proximity as the validation metric. RSSI contact threshold may be set relatively high in this case, such as −45 dBm which typically is equivalent to within one meter distance of each other. RSSI filter threshold may also be set high such as −60 dBm so the mother wristband does not consume power unnecessarily to process receive data packets when it is not near any other wristbands.

All data transmitted by the tags may be encrypted using a network key, which is assigned to each tag within the same account. For convenience, to operate with third party, the tag may also log a standard Bluetooth Low Energy (BLE) beacon format, such as iBeacon, that meets specific criteria, such as a universally unique identifier (UUID). Thus, third-party products such as generic iBeacons commonly available may be used to implement the disclosed solution. In some embodiments, iBeacons may be used as location markers, so that the tags may also log physical locations where they have been. In this case, the RSSI contact threshold logic may not need to apply, so that tags may log locations using iBeacons outside of a configured proximity intended to track contagious contact.

Tags and iBeacons may be used to mark and track assets. In this case, any close interaction between personnel and assets may be logged. Asset usage by personnel and time duration may then be tracked. More generally, listener tags and non-listener tags may be used in combination, with some tags at fixed locations, which may facilitate precise location determination. Listener tags may report all received beacon RSSI and send to listeners, while its own transmitted packets may be measured by listeners for RSSI. This data may be used to contribute to much higher accuracy in location determination. Beacons may be normal beacon signals that are very low power. Thus tags may be battery-powered and placed in abundance for precise locations where needed.

In another embodiment, tags may contain a display so that messages and other graphics may be displayed in addition to the normal functions of contact tracing and location tracking. Tags with display may respond to location iBeacons by displaying relevant location-based information such as offers for purchases. The same tags may be equipped with touch screen input so that the user may respond to messages, for example accepting an offer and making a purchase. Similarly, the display may show content based on time so that user will see relevant information, such as notice ahead of an event so that the user may purchase admission to the event. The location and time-based content may be pre-loaded into the tag so that no information needs to be sent to the tag in real-time.

FIG. 1 illustrates power-saving via RSSI 100 in accordance with one embodiment. FIG. 1 shows a gateway 102, transceiver tags within system configured proximity 104, transceiver tags within signal range but outside of system configured proximity 106, and transceiver tag outside of configured proximity and outside of signal range 108.

For contact tracing, static beacons, gateways and transceiver tags may transmit beacon signals at regular intervals, such as once per second. Tags may need to receive continuously to detect the presence of neighboring transceiver tags within system configured proximity 104, as determined by the RSSI value of the data packets received from those tags.

In some embodiments, beacon signals and data packets may be detected from transceiver tags within signal range but outside of system configured proximity 106. In a contact tracing embodiment, the tags of concern may be those within the configured proximity, as tags indicating persons outside of that proximity may not be associated with possible contagion. To save power and storage space on the transceiver tags, signals detected from transceiver tags within signal range but outside of system configured proximity 106 may not be stored or analyzed once it is determined that they emanate from tags too far away to be of concern.

Instead of being continuously powered on to receive, the transceiver tag may power down, then wake when triggered by radio signal activities, specifically of a specific signal frequency and type, such as Bluetooth Low Energy. As soon as the transceiver tag completes reception of a data packet, it may power down to save power. Thus, when outside of the normal operating hours or environment, such as a tag that is taken home at night, a transceiver tag outside of configured proximity and outside of signal range 108 may be in very low power state being without the presence of any other transceiver tags within system configured proximity 104.

Another method to save power for the receiver pertains to powering down the receiver in regular intervals, with the receive interval and duty cycle related to the transmit interval and duty cycle under specific conditions (see detailed description with regard to FIG. 6) that prevent reception from exceeding a predetermined time latency. The present disclosure also provides the methods to parameterize and configure such conditions to meet application requirements. For example the requirements in a contact tracing application may be more stringent in order to capture close contacts within seconds, and accumulate close contact time up to fifteen minutes, as typical for determination of exposure to infected persons. As a different example, the verification of mother-infant pairing in maternity wards may utilize a less stringent time resolution, which then allows a lower duty cycle in order to use the smallest amount of battery power possible for an infant-worn wristband.

In addition to filtering out data packets received from transceiver tags within signal range but outside of system configured proximity 106, the receive function of a tag may filter the received data packets so that the packets transmitted from specific group of tags, for example those belonging to the same company, based on content of the data packets, may be accepted, and others ignored. Accepted data packets may be stored locally either in RAM or non-volatile memory such as flash.

Stored data may be uploaded regularly to the cloud server, so that data is available in real-time. Alternatively data may be uploaded occasionally, such as once per day, to provide stored information for later use. Data may be uploaded by mobile phone software applications using mobile phones as gateway devices, or they may be uploaded via stand-alone dedicated infrastructure devices such as BLE mesh receivers and gateways 102.

FIG. 2 illustrates a public health system 200 in accordance with one embodiment. A quarantined person 202 may be issued a transceiver tag wrist band 204 that emits a beacon with an encrypted identifier not known and identifiable by the public. The quarantined person 202 may install a mobile device tracking application on their mobile device 206 to capture encrypted beacon signals 208 from the transceiver tag wrist band 204, identify the person's location, and send data 210 to the public health cloud 212. The quarantine mobile device tracking application may configure the mobile device 206 to emit similar beacon signals, also with encrypted identifiers not known or identifiable to the public.

Public persons 214 may be advised to install and run an application voluntarily which captures the encrypted beacon signals 218 emitted by the transceiver tag wrist band 204 or mobile device 206 of the quarantined person 202. The encrypted beacon signals 218 may be forwarded on 220 by the mobile device 216 of the public person 214 to the public health cloud 212 for analysis. An alert notification 222 may be sent to the mobile device 216 if the beacon received by the public mobile device tracking application is above a threshold indicating that the public person 214 may now be infected and may need to go into quarantine.

Figure 3:
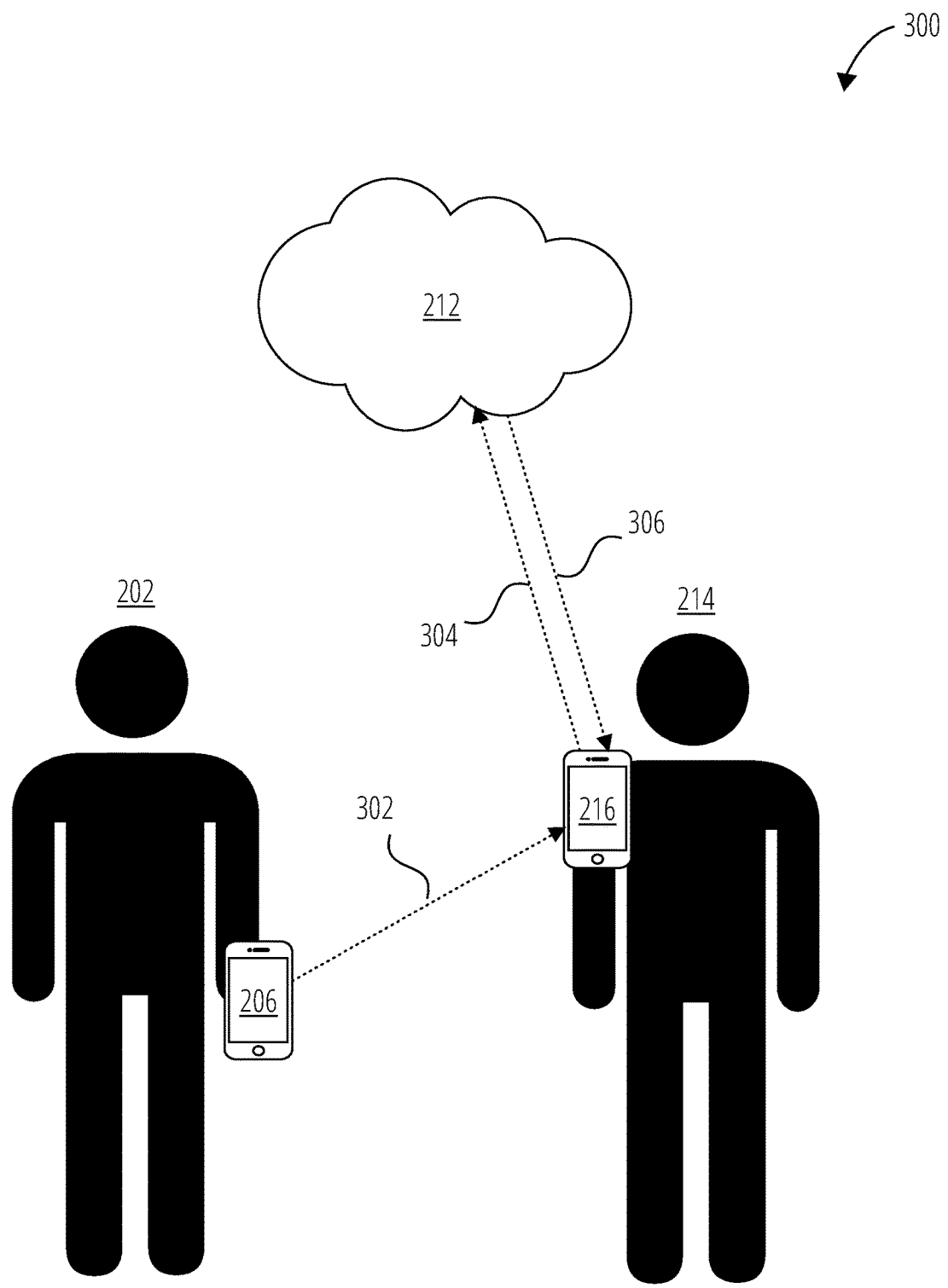
FIG. 3 illustrates a public health system 300 in accordance with one embodiment.

FIG. 3 further illustrates a public health system 300 in accordance with one embodiment, showing steps taken subsequent to the activities described with respect to FIG. 2. These steps may be applied based on algorithms running in the public health cloud 212 indicating spread.

As indicated in FIG. 2, an alert notification 222 may be sent to the mobile device 216 if the beacon received by the public mobile device tracking application is above a threshold indicating that the public person 214 may now be infected and may need to go into quarantine. The mobile device 216 which received this notification may be configured by the application to begin emitting beacon signals that may be received by other mobile devices with the public application installed.

The mobile device 206 of the quarantined person 202 may detect and send GPS coordinates 302 of the location of the mobile device 206, and send these GPS coordinates 302 to the mobile device 216, which may forward these coordinates 304 to the public health cloud 212. The forwarded GPS coordinates may be used to indicate a location at which spread is detected.

Identifying a quarantined person 202 in public may be used to alert health care authorities and inform public persons 214 in the vicinity. Time and GPS co-ordinates of identification of the quarantined person 202 in public may be further used for real-time or offline warning of spread. In this manner, places of frequent spread may be identified as risky zones. The public application may receive and display a risky zone alert 306 received when the GPS coordinates of the mobile device 216 indicate entry into a risky zone.

Figure 4:
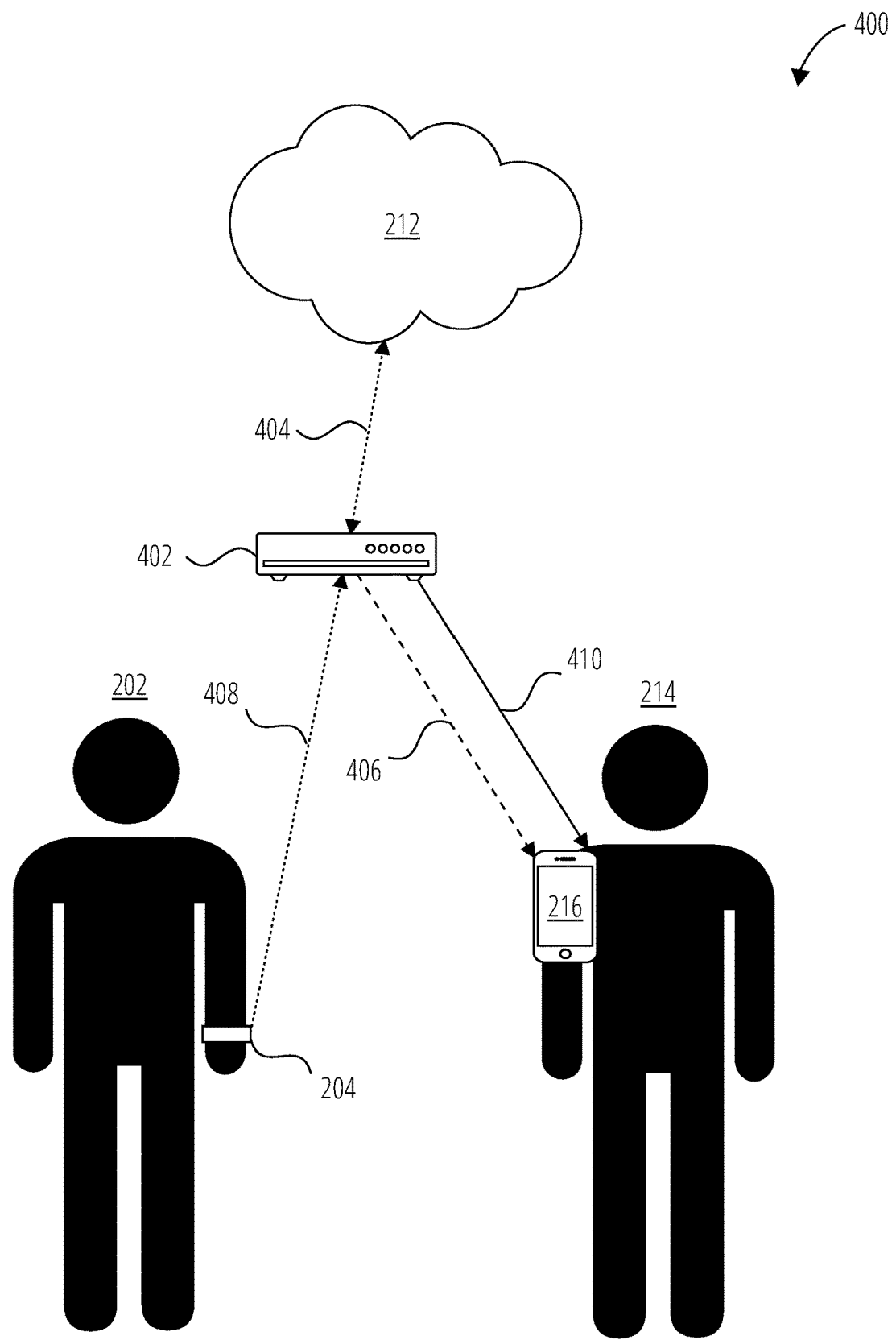
FIG. 4 illustrates a public health system 400 in accordance with one embodiment.

FIG. 4 illustrates a public health system 400 embodiment wherein a dedicated beacon listener device 402 may be installed in risky zones identified by the activities introduced in FIG. 2 and FIG. 3. The dedicated beacon listener devices 402 may be used to alert public health officials.

The dedicated beacon listener device 402 may communicate with the public health cloud 212 via a combination of wired and wired or wireless internet connections 404. The dedicated beacon listener device 402, based on instruction from the public health cloud 212, may send instructions to elevate warning levels 410 that may be captured by public applications on mobile devices 216 carried by public persons 214. When a public person 214 enters a risky zone, their mobile device 216 may display a warning message 406.

The transceiver tag wrist band 204 of a quarantined person 202 may transmit encrypted beacon signals 408 that may be detected by the dedicated beacon listener device 402 and analyzed by the public health cloud 212. Identification of a quarantined person 202 or a potentially infected person (as identified by the configuration of the public application installed on their mobile device 216, described in FIG. 3) within the area covered by a dedicated beacon listener device 402 may be used to elevate warning levels 410 sent to public applications.

Figure 5A:
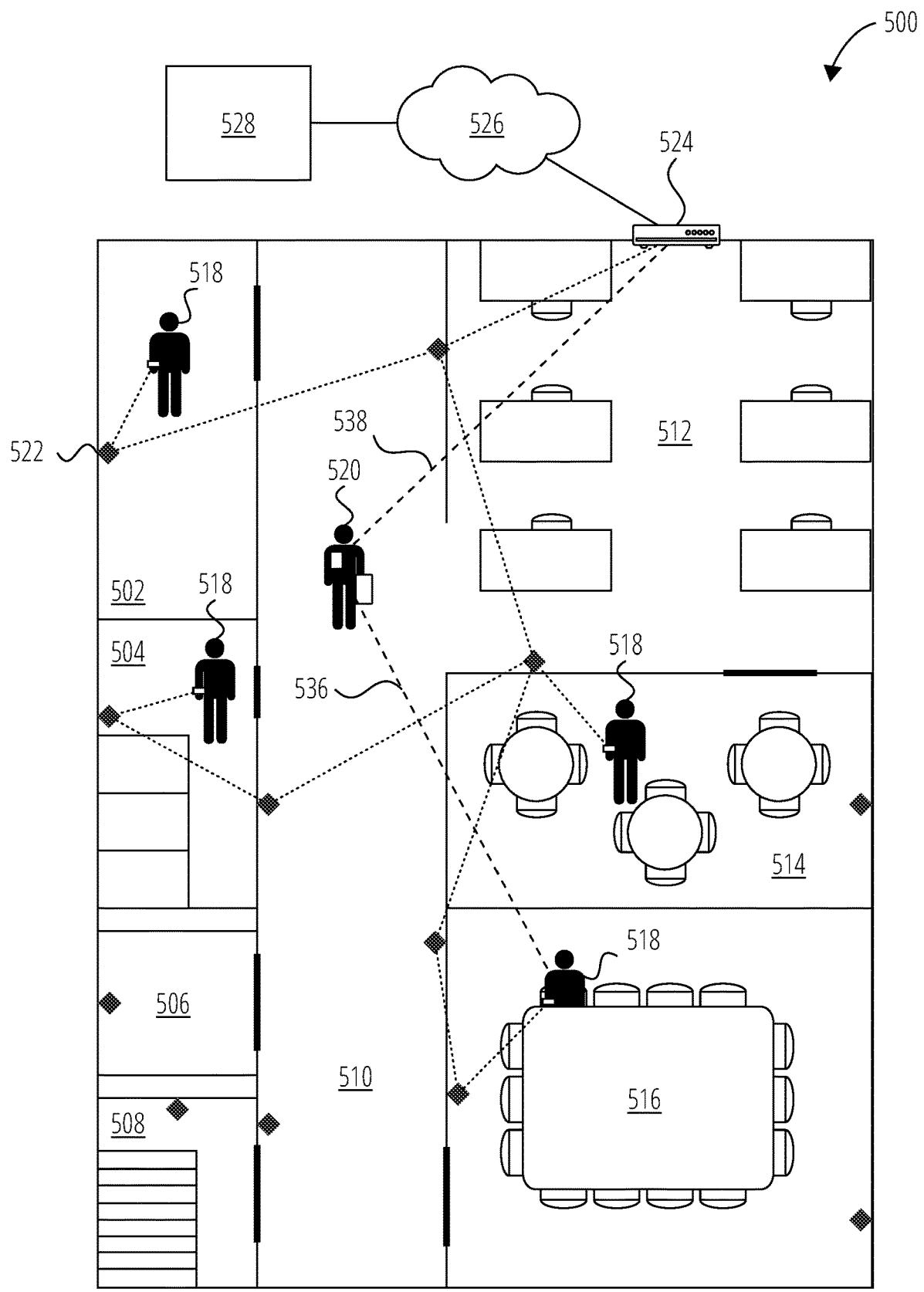
FIG. 5A illustrates an office building tracking system 500 in accordance with one embodiment.

FIG. 5A illustrates an office building tracking system 500 in accordance with one embodiment. The office building tracking system 500 may be deployed in an office space comprising offices 502, restrooms 504, elevators 506, stairwells 508, corridors 510, open workspaces 512, break rooms 514, and conference rooms 516. Static beacons 522 may be installed at known locations throughout the office building tracking system 500, and may provide absolute location data in addition to the relative nearness data provided by the interaction of transceiver tags.

Figure 5C:
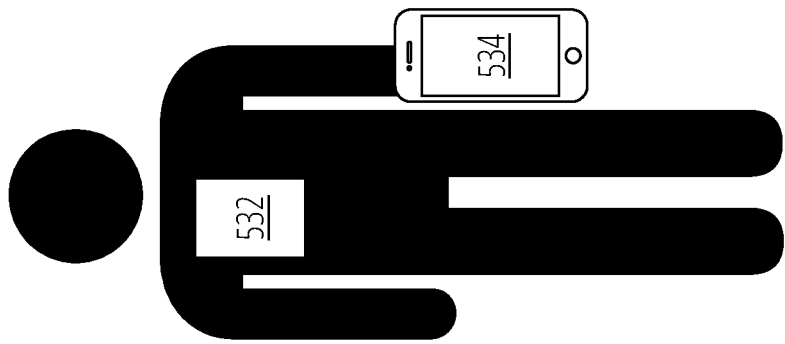
FIG. 5C is an enlarged view illustrating a personnel with control application 520 from FIG. 5A in accordance with one embodiment.
Figure 5B:
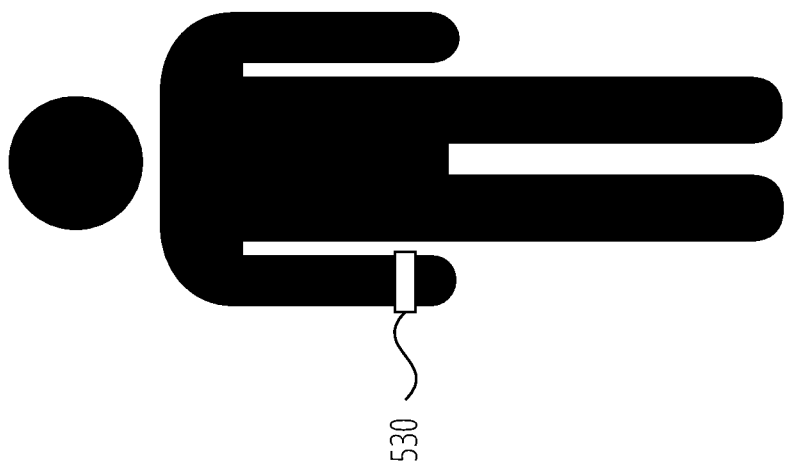
FIG. 5B is an enlarged view illustrating a personnel with transceiver tag 518 from FIG. 5A in accordance with one embodiment.

Personnel with transceiver tags 518 and personnel with control applications 520 may be tracked as they move through these spaces through the use of transceiver tags 530 in the form of wrist bands, as illustrated on the personnel with transceiver tag 518 shown in greater detail in FIG. 5B, transceiver tags 532 in the form of badges as illustrated on the personnel with control application 520 shown in greater detail in FIG. 5C, or transceiver tags in some other form worn by other personnel, and gateways 524 installed within the office building tracking system 500. Gateways 524 may connect to the internet 526 and may thereby provide data from the transceiver tags and static beacons of the office building tracking system 500 to servers 528 that may analyze and report on the collected data. Any personnel in any role may be equipped with any type of transceiver tag as disclosed herein; this illustration is not intended to limit tag types to particular roles.

Gateways 524 in some embodiments may be capable of pushing commands and notifications to mobile devices and transceiver tags within their signaling range, as well as accept upload of data stored on transceiver tags. Gateways 524 may be positioned at entrances and exits to the building or office suite to ensure that personnel with transceiver tag 518 pass near a gateway 524 at least once per business day. Transceiver tags 530 and 532 as well as mobile devices 534 may also communicate with gateways 524 for record upload 538. This process is described in greater detail with respect to FIG. 17.

In some embodiments, the server 528 may analyze data and determine that a particular personnel with transceiver tag 518 has not passed by a gateway 524 within an unexpectedly long timeframe, indicating potential failure to wear their transceiver tag, or that their transceiver tag has malfunctioned or been disabled. Notifications from gateways 524 may be displayed on mobile devices carried by personnel within the office building tracking system 500.

In one embodiment, some personnel such as managers, health and safety workers, or security workers may carry mobile devices 534 having a control application installed. Personnel with control applications 520 may receive additional notifications based on personnel with transceiver tags 518 in their immediate vicinity or track personnel with transceiver tags 518 on a map, similar to the embodiment described in more detail with respect to FIG. 8A-FIG. 9D. In one embodiment, the control application may provide information to facilitate contact tracing 536 within a facility when someone among the personnel tests positive. The mobile devices 534 may be configured by the control application to send messages to other nearby mobile device 534 and may send commands or additional data packets to transceiver tags within their signal reach or configured proximity.

Figure 6:
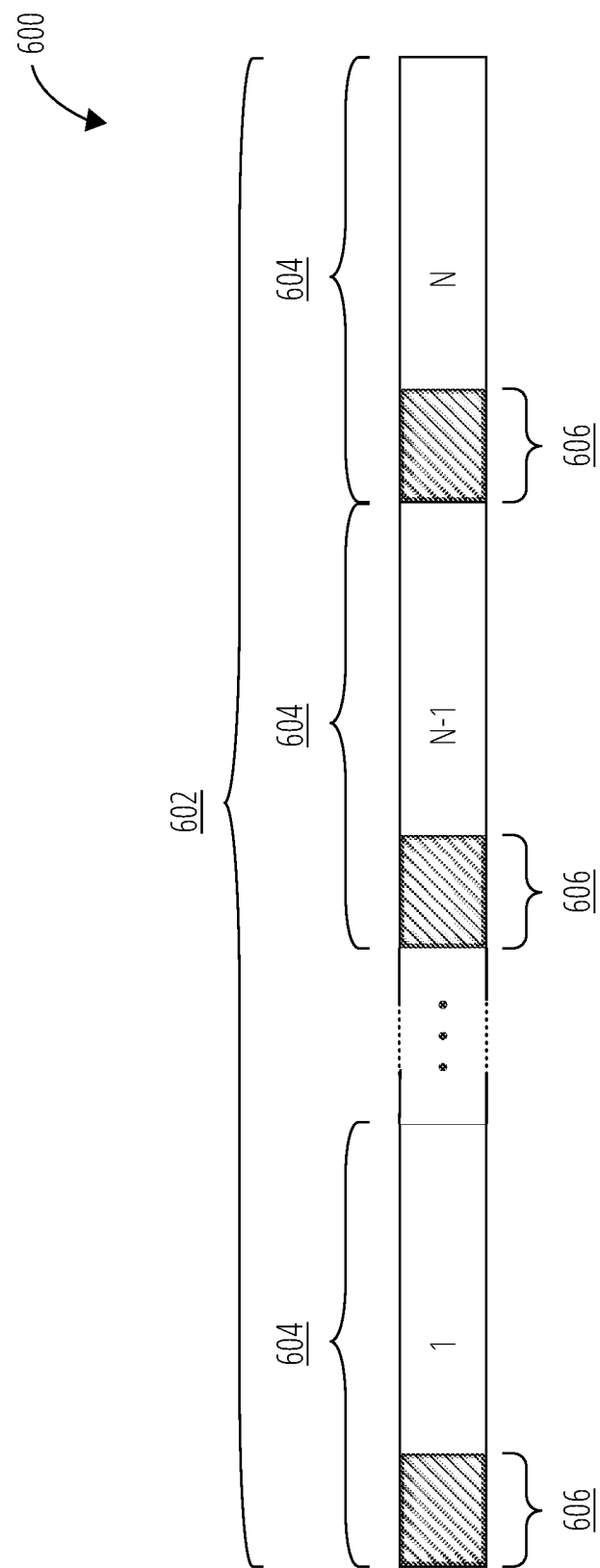
FIG. 6 illustrates a listener tag timing operation 600 in accordance with one embodiment.

FIG. 6 illustrates listener tag timing operation 600 in accordance with one embodiment. The listener tag timing operation 600 comprises a contact window 602, a scan period 604, and a receiving time 606. The contact window 602 may be represented as a number N times the scan period 604. Each scan period 604 may include a receiving time 606. These parameters may be made configurable to a transceiver tag either by mobile devices via a mobile device tracking application, via a gateway, via a control tag, or by other means compatible with the transceiver tags disclosed herein.

In order to achieve power-saving and minimize battery size, or maximize battery life, while maintaining sufficient performance to address different application requirements, the transceiver tag's operation may be configured by a set of parameters including RSSI filter threshold, RSSI contact threshold, advertising interval, contact window, scan period, and scan duty cycle.

RSSI filter threshold is the received signal power of a received packet, below which the transceiver tag will discard a received data packet rather than storing and processing it. This allows low level signals representing other transceiver tags that are physically too distant to be considered from being processed and consuming energy.

RSSI contact threshold is the minimum received signal level setting that qualifies a contact, which may create a contact record and may trigger a social distancing alert. Signal levels of each received data packet are processed by a smoothing filter over the contact window 602 time duration, and the smoothing filter output is compared against this RSSI contact threshold to determine if any actions are to be executed by the transceiver tag. The smoothing filter may be a running average of the raw RSSI values, so that the instantaneous fluctuation due to indoor multipath propagation is reduced and a more accurate value that relates to distance between the two transceiver tags is obtained.

Allowing the contact window 602 to be configurable allows different customer application environments to be addressed. For example, a highly dynamic environment requiring fast response for a social distancing alert may set a shorter contact window 602 than a more static environment such as an office, where inhabitants are less mobile and the contact window 602 may be set longer to reduce unnecessary disturbance by the alerts.

An advertising interval is the time interval between two consecutive transmitted packets, being advertising packets in Bluetooth. Setting the advertising interval allows tradeoff between power consumption and increasing the accuracy of distance measurements by having more data packets, and thus more RSSI samples.

The scan period 604 is the time period between the beginning of each receiving time 606, which is when the transceiver tag is in receiving mode. The scan duty cycle defines the percentage of time during the scan period 604 that the transceiver tag is actually receiving signal, which may be calculated as:

$$\text{Scan Duty Cycle} = \frac{\text{Receiving Time}}{\text{Scan Period}} \times 100\% \qquad \text{Equation 1}$$

For example, a scan period 604 of 10 seconds, with a receiving time of 2 seconds has a scan duty cycle of 20%. Calculation of RSSI contact threshold is based on the contact window. As the power consumption for receiving (or scanning) is typically much higher than that for transmitting a beacon alone, having a scan duty cycle set to typically 20% may provide a beneficial tradeoff between power consumption and receive performance.

Figure 7B:
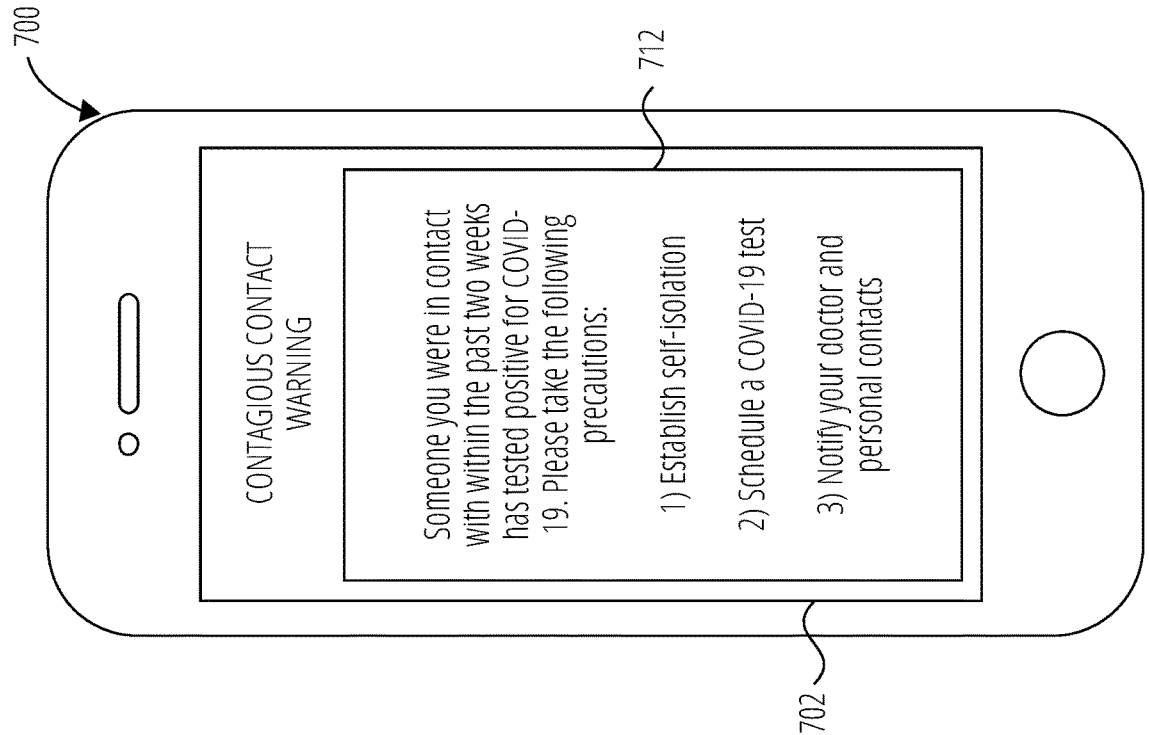
FIG. 7B illustrates a front view of a mobile device 700 running a tracking application as part of an office building tracking system in accordance with one embodiment.
Figure 7A:
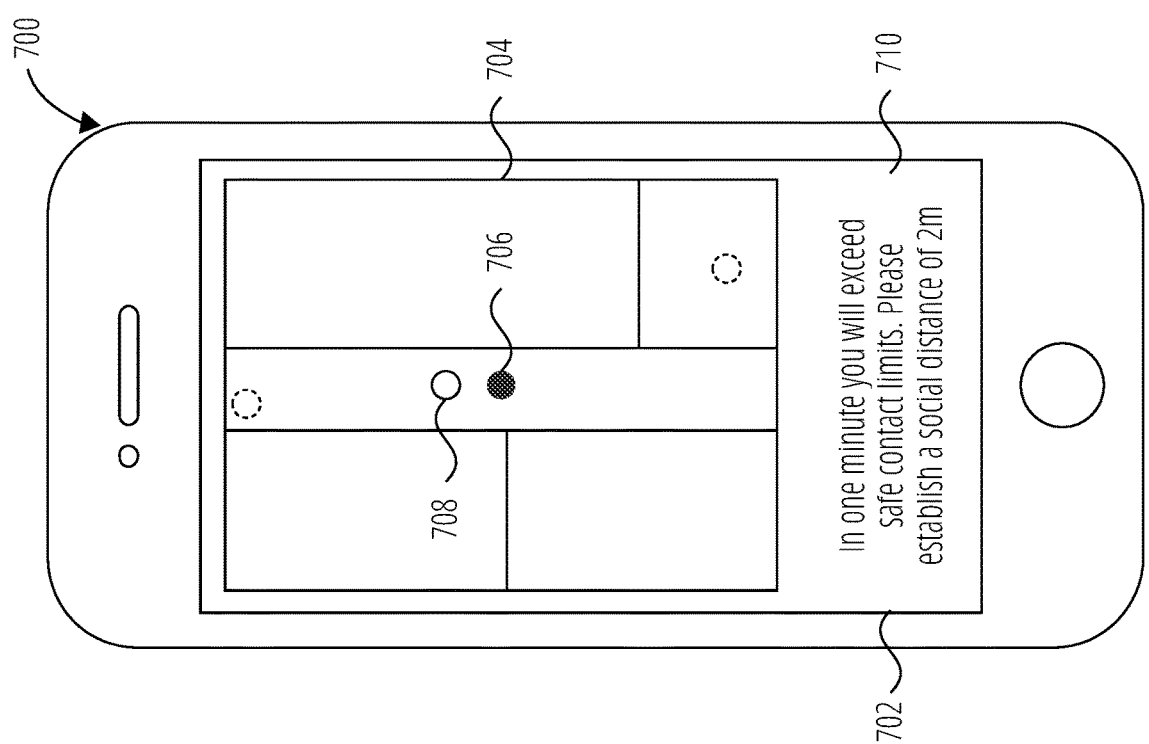
FIG. 7A illustrates a front view of a mobile device 700 running a tracking application as part of an office building tracking system in accordance with one embodiment.

FIG. 7A shows a mobile device 700 displaying alerts in accordance with one embodiment. The mobile device 700 may have a mobile device tracking application 702 installed. The mobile device tracking application 702 may detect when a user 706 wearing a transceiver tag is too close to a contact within configured proximity 708, also wearing a transceiver tag. If configured proximity boundaries are infringed, or are infringed for more than a configurable time limit, a social distancing alert 710 may be sent to the user's mobile device 700.

For example, the Center for Disease Control (CDC) recommends that people maintain a distance of at least 6 feet between themselves and others, and defines a potential contagious contact as being within 6 feet of another person for 15 minutes or more. The disclosed system may detect that another tag wearer has come within 6 feet of the user, and the user's mobile device 700 may issue an alert. The mobile device 700 may issue additional or louder, more urgent, more persistent alerts as the 15 minute mark is reached and the two tags still indicate contact within 6 feet. The user 706 and contact within configured proximity 708, as well as other tag-wearing personnel, may be displayed on a map 704, such that the user 706 may be able to see at a glance how to best reestablish safe social distancing.

FIG. 7B shows a mobile device 700 displaying alerts in accordance with one embodiment. The mobile device 700 may have a mobile device tracking application 702 installed. The mobile device tracking application 702 may be in contact with a server as described with regard to FIG. 5A. The mobile device 700 may receive a notification that someone with whom the user 706 was within a configured proximity to within a configured previous time span has tested positive for a contagion. The contact may also meet certain contact duration limits to trigger the mobile device 700 to display a warning message 712.

For example, the contagion period for COVID-19 is indicated to be two weeks. While maintaining anonymity, the system may establish that a user 706 was within 6 feet of a person who has now been flagged as testing positive for this virus within the past fourteen days. The mobile device tracking application 702 may provide notification to the user 706, and may further provide instructions for how to proceed.

Figure 8A:
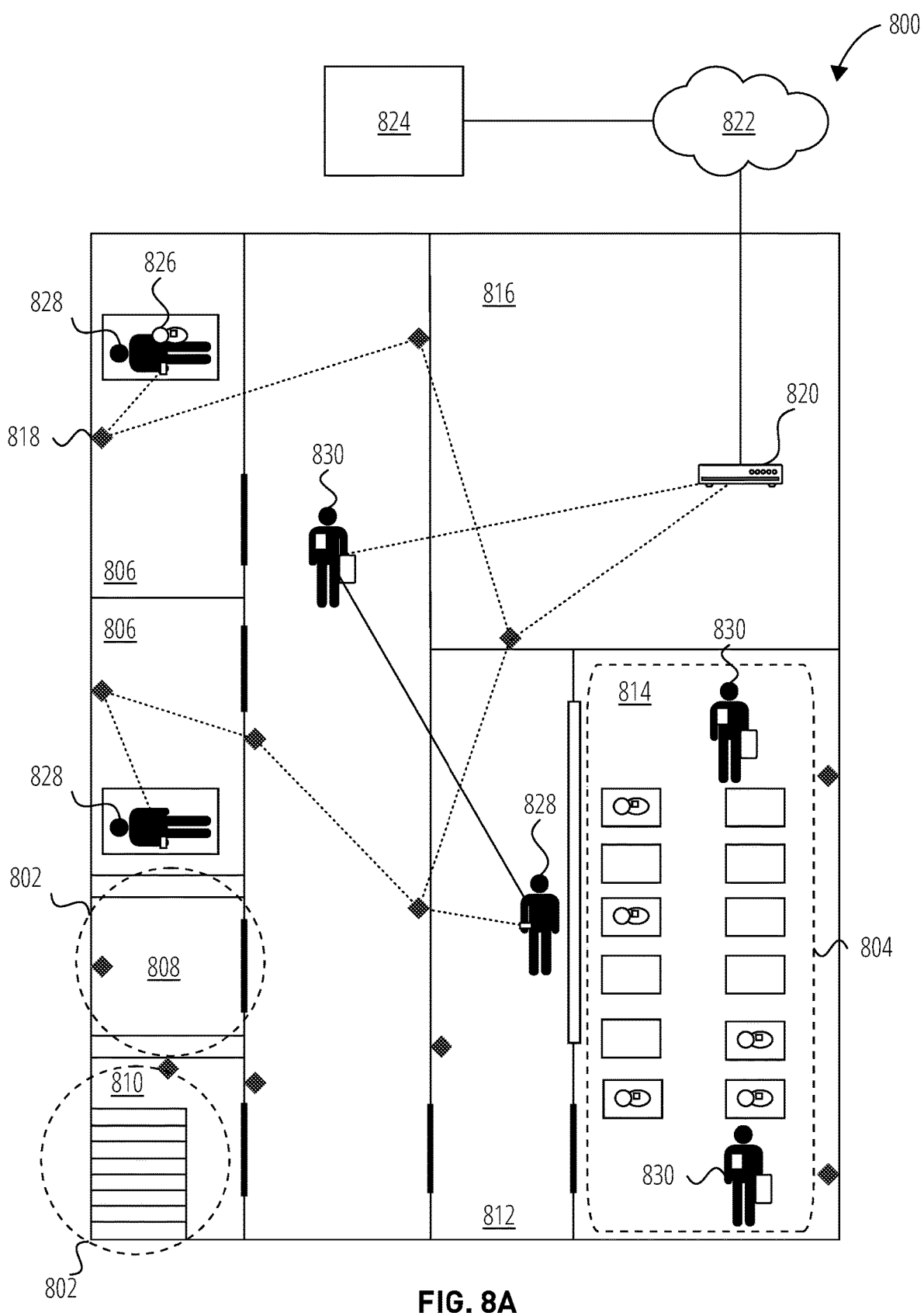
FIG. 8A illustrates a maternity ward tracking system 800 in accordance with one embodiment.

FIG. 8A is an illustration of a maternity ward tracking system 800, according to an embodiment of the present disclosure. the maternity ward tracking system 800 includes delivery rooms 806, an elevator 808, a stairwell 810, a viewing room 812, a nursery 814, and an equipment room 816. Listeners 818 are located throughout the maternity ward.

Figure 8D:
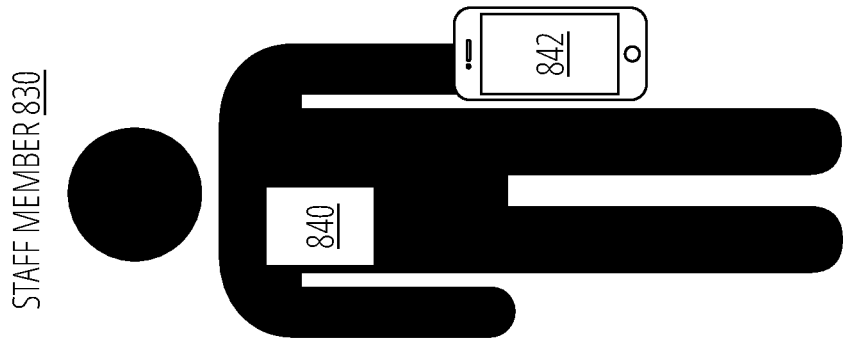
FIG. 8D is an enlarged view illustrating a staff member 910 from FIG. 8A in accordance with one embodiment.
Figure 8C:
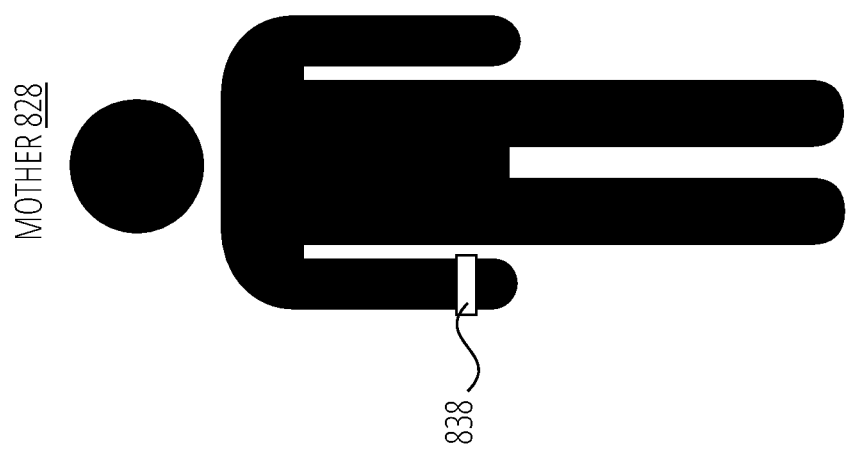
FIG. 8C is an enlarged view illustrating a mother 828 from FIG. 8A in accordance with one embodiment.
Figure 8B:
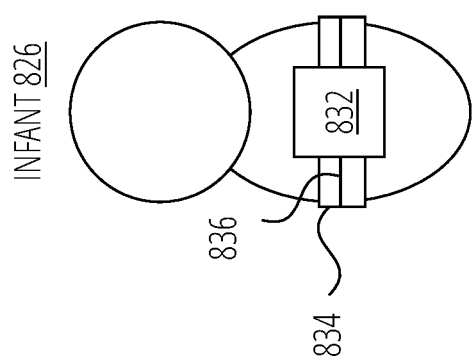
FIG. 8B is an enlarged view illustrating an infant 826 from FIG. 8A in accordance with one embodiment.

Each infant 826 has a non-listener tag 832, as more clearly shown in FIG. 8B in a band tag embodiment. In this embodiment, the non-listener tag 832 is a battery powered BLE module that emits beacon signals at fixed intervals in order to conserve power. While the non-listener tag 832 is shown as a badge here, any suitable item, such as a leg band, a wristband, a headband, an article of clothing, etc. may be affixed with the tag or have the tag integrated therein without deviating from the scope of this disclosure.

Non-listener tags 832 may emit encrypted beacon packets. For instance, a header of the packets may identify a non-listener tag 832 via an associated identifier, and the packet payload may be encrypted. Listener tags 838, listeners 818, and gateways 820 may not be able to decrypt the packets in some embodiments. Rather, a server 824 may be needed for decryption.

As shown in FIG. 8B, the non-listener tag 832 may also provide tamper notifications via a wire 836 in band 834 when tampered without proper discharge process in the system. For instance, if the wire 836 is severed (e.g., the band 834 is cut), the non-listener tag 832 may detect that a signal is no longer transmitted through the wire 836 and emit an appropriate notification in its beacon. This may be received by listener tags 838 and/or listeners 818, and relayed to server 824. An emergency notification may then be sent to staff member 830 and appropriate measures may be taken (e.g., locking down the healthcare facility, notifying security personnel and/or police, etc.).

Each mother 828 has a listener tag 838, as is more clearly shown in FIG. 8C. In addition to periodically emitting its own beacon signal, listener tag 838 listens for non-listener tags 832 and relays tag information to listeners 818. Listeners 818, in turn, relay the tag information to other listeners 818 until it reaches a gateway 820, which transmits the tag information to a server 824 via the internet 822. Listeners 818 and gateways 820 collectively form a mesh network. Listener tags 838 not only periodically emit a beacon signal, but also listen for other beacon signals from non-listener tags 832 and send this proximity information to server 824 via listeners 818 and gateways 820 (e.g., by providing Received Signal Strength Indicators (RSSIs) for each detected tag). This is shown by dashed lines in FIG. 8A from each listener tag 838.

The proximity of each tag to listener tags 838 and/or listeners 818 may mainly be calculated using RSSI values. A function may be implemented for calculating the coordinates of the position by taking different RSSI values of non-listener tags 832 under available listeners 818. Calculation position coordinates may be performed on the server 824. Notifications and alerts may be generated by server 824 and sent to a mobile application running on mobile device 842 of staff member 830, for instance. The mobile application, which may contain a map of the region (e.g., the floor), may also be updated with the latest position of non-listener tags 832 and/or listener tags 838. Also, a name and/or identifier of the infant 826 may be displayed.

Non-listener tags 832 and listener tags 838 may be configured to conserve power, particularly since a non-listener tag 832 may have a smaller battery in some embodiments. For instance, a non-listener tag 832 may be configured to advertise for 10 ms every 900 ms. Listener tag 838 may be configured to listen for 100 ms in every second (i.e., wait 1,000 ms and then listen for 100 ms). However, any suitable communication intervals and lengths may be used without deviating from the scope of the disclosure.

In this scheme, listener tag 838 is able to detect proximate non-listener tags 832 once every ten seconds. Thus, the location of infant 826 having associated non-listener tag 832 will be accurate within ten second intervals. Also, listener tag 838 may be configured to report non-listener tags 832 with an RSSI of a predetermined minimum strength. This ensures that listener tags 838 do not receive signal from non-listener tags 832 that are too far away, thus reducing noise.

The association of listener tags 838 and non-listener tags 832 may be used for various applications that employ location and proximity tracking. For example, non-listener tags 832 could be provided to visitors and listener tags 838 could be provided to staff escorting visitors to ensure that the visitors are accompanied by proximate staff. Certain safe zones 804 and/or alarm zones 802 may exist in some embodiments. For instance, alarm zones 802 may exist at the elevator 808 and the stairwell 810. If an infant 826 is brought to, and detected at, these areas, this may indicate that the infant 826 is being abducted or otherwise moved without authorization and an alarm may be sounded. A safe zone 804 may also exists in the nursery 814. If an infant 826 is removed from the nursery 814, and the infant 826 is not proximate to a staff member 830, an alert may be issued. This alert may be received by mobile devices 842 of staff members 830, mother 828, and/or by any other suitable person or device without deviating from the scope of this disclosure.

In some embodiments, the system may detect that the wrong infant 826 has been placed with a mother 828. For instance, if an infant 826 is placed with a mother 828 in delivery room 806 by a staff member 830, but infant 826 is not that mother's infant, an alert may be sent to any suitable staff member's mobile device, or any other suitable device, informing the staff member(s) that infant 826 is not the correct infant. The staff member(s) may then retrieve the infant and provide the mother with the correct infant.

Listeners 818 may be battery or Alternating Current (AC) powered BLE modules that listen for beacons and rebroadcast the beacon packets over a mesh network. Battery life may be limited due to constant switching between listening and broadcasting. Per the above, listeners 818 are part of a mesh network that transmits received packets to gateway 820, through which packets are sent to server 824 via internet 822. Listeners 818 paired to the same account and thus having the same network security key may be able to receive from infant tags directly.

Gateways 820 may be AC powered BLE and Wi-Fi bridges that receive packets from the BLE mesh network or directly from BLE tags, and transmit those packets to server 824 via the internet 822. Gateway 820 may not retransmit beacon packets to the mesh network in some embodiments, but rather, may transmit this information solely to server 824.

Staff member 830 in this embodiment may have a staff tag 840 and a mobile device 842, such as a smart phone, a tablet, or any other suitable mobile device, as shown in FIG. 8D. Staff tag 840 may be identical to listener tag 838 in some embodiments, or may have additional functionality for improved tracking. For instance, in some embodiments, staff tag 840 may listen for non-listener tags 832, listener tags 838, and/or other staff tags 840 and broadcast RSSI information for detected tags for receipt by listeners 818.

A mobile application running on mobile device 842 may be used for associating non-listener tags 832 with infants, to present the current location and alert information for non-listener tags 832, and/or for configuring and managing different components of the system. For instance, listener tags 838 for mothers may also be configured.

Server 824 receives tag information from gateways 820 and creates alerts pertaining to danger zones, infants being taken out of safe zones, the wrong infant being placed with a mother, low battery, tamper actions, location information, or any combination thereof. For instance, if a non-listener tag 832 is at more than a predetermined RSSI from the elevator 808 or stairwell 508 alarm zones 802 by an associated listener 818, this information may be transmitted through the mesh network and server 824 may then cause appropriate alarms to be issued. Similarly, if an infant is taken out of safe zone 804, an appropriate alert may be provided. However, if the infant's non-listener tag 832 is received by a staff tag 840 with a sufficient RSSI, this information may be sent through the mesh network to indicate that the infant is with a staff member and appropriate custody is still being maintained.

Non-listener tag 832 and listener tag 838 may be configured to conserve power, particularly since non-listener tag 832 may have a smaller battery in some embodiments. For instance, non-listener tag 832 may be configured to advertise every 900 ms for 10 ms. Listener tag 838 may be configured to listen every second for 100 ms (i.e., wait 1,000 ms and then listen for 100 ms). However, any suitable communication intervals and lengths may be used without deviating from the scope of this disclosure.

In this scheme, listener tag 838 is able to detect proximate non-listener tags 832 once every ten seconds. Thus, the location of infant 826 wearing non-listener tag 832 will be accurate within ten second intervals. Also, listener tag 838 may be configured to receive non-listener tags 832 with an RSSI of a predetermined minimum strength. This ensures that listener tags 838 do not receive signal from non-listener tags 832 that are too far away, thus reducing noise.

Figure 9B:
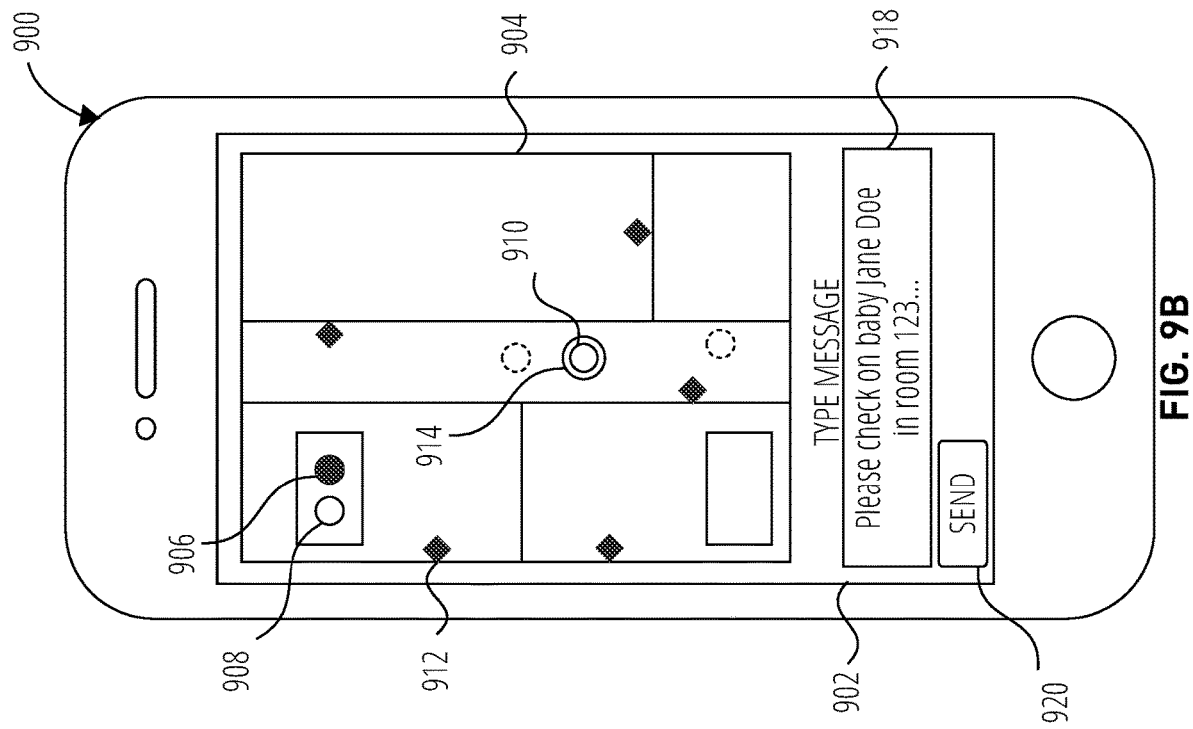
FIG. 9B illustrates a front view of a mobile device 900 running a tracking application with messaging functionality in accordance with one embodiment.
Figure 9A:
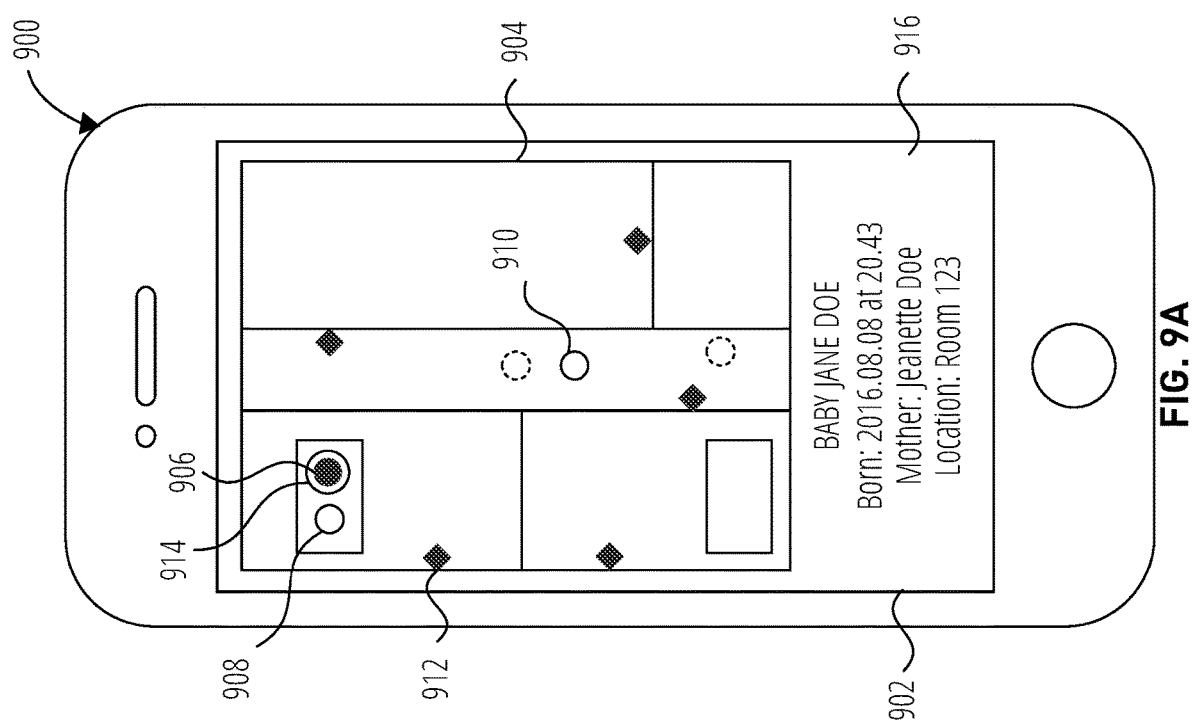
FIG. 9A illustrates a front view of a mobile device 900 running a tracking application in accordance with one embodiment.

FIG. 9A illustrates a front view of a mobile device 900 running a mobile device tracking application 902, according to an embodiment of the present disclosure. Mobile device tracking application 902 includes a map 904 and an information panel 916 that includes various information about a selected infant 906. In this embodiment, information panel 916 includes the infant's name, date and time of birth, mother, and location. However, any suitable information may be included without deviating from the scope of this disclosure including, but not limited to, mother/infant bonding time, staff member name and identifier, infant length and weight, infant sex, and/or any other desired information. Furthermore, the information that is displayed may change based on the type of individual that is selected. For instance, the displayed information may differ based on whether an infant 906, mother 908, or staff member 910 is selected. The current selection is shown by selection circle 914 in this embodiment. Listeners 912 are also shown here, but in some embodiments, these may not be present.

Furthermore, mobile device tracking application 902 may allow a user to send messages to selected mothers and/or staff members. This is illustrated in FIG. 9B. Here, a staff member is typing a message to another staff member 910, who is shown as selected via selection circle 914. The user may then send the message 918 by hitting send button 920.

As discussed above, staff members may be informed if the wrong baby is placed with a mother. For instance, in FIG. 9C, baby Mary Jones has been placed with mother Jeanette Doe. Assuming tags and listener tags have the timing discussed above, the system will detect that the wrong infant is proximate to the wrong mother within ten seconds. An alert is then sent to mobile device 900 and displayed on mobile device tracking application 902. A message 924 informs the staff member of the error and provides instructions. An indicator circle 922 shows the misplaced infant on map 904.

Figure 9D:
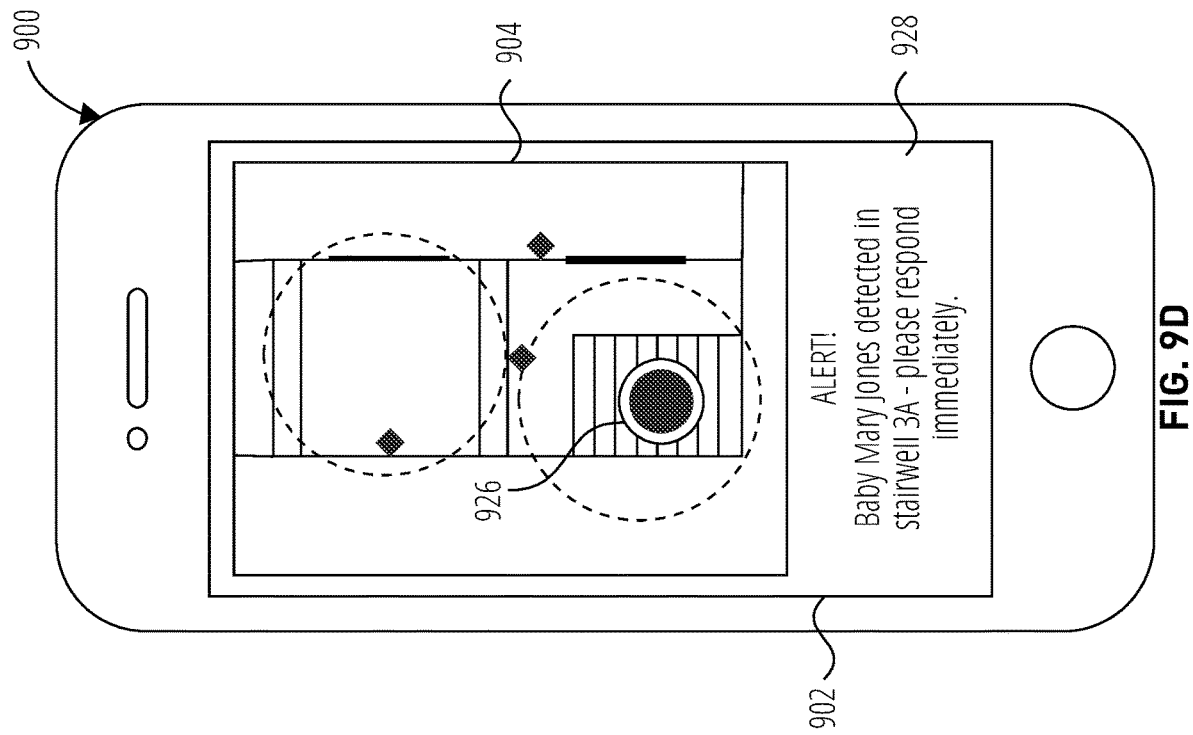
FIG. 9D illustrates a front view of a mobile device 900 running a tracking application with a danger zone alert in accordance with one embodiment.
Figure 9C:
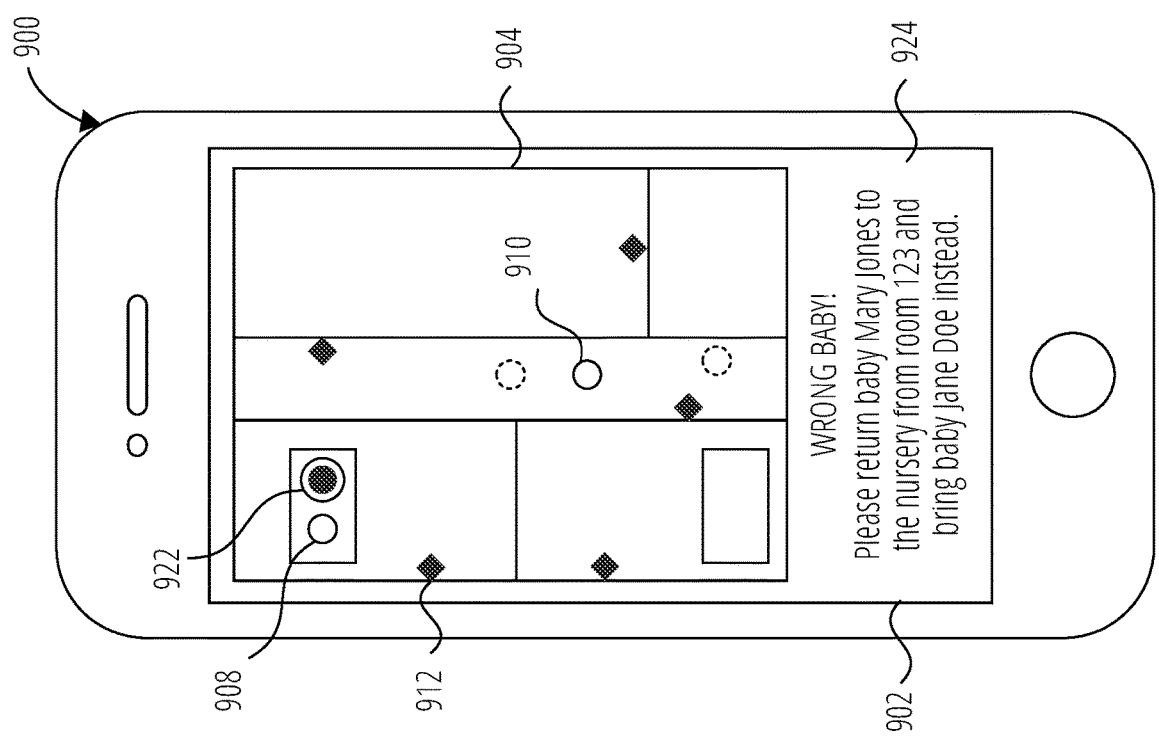
FIG. 9C illustrates a front view of a mobile device 900 running a tracking application with a wrong baby alert in accordance with one embodiment.

Staff members and/or any other suitable personnel may also be notified if an infant is taken to an unauthorized area. This scenario is shown in FIG. 9D. Here, baby Mary Jones is detected being taken into a stairwell by an associated listener, and no staff member is detected proximate to the baby. Upon detecting this event, the server sends an alert message to staff mobile devices, such as mobile device 900, which is displayed as alert message 928 by mobile device tracking application 902. A location indicator 926 shows the location of the infant on map 904. In some embodiments, mobile device tracking application 902 may change map 904 to display the location of the infant, regardless of where the staff member having mobile device 900 actually is. A similar message may be provided in the event that a tag is tampered with or cut.

In embodiments where a tracking system is used to monitor visitors to a secure location, these visitors may be provided with non-listener tags similar to those provided to infants as described above. Approved guides and guards may be provided with staff tags. Areas with heavier security needs, or areas open to the public, may be designated as alarm zones or safe zones, respectively. Guards may carry mobile devices providing messages similar to those described with respect to FIG. 9A-FIG. 9D to indicate that visitors are with their assigned guides, a guard, or alert when they are away from these personnel, or in high security areas alone or with personnel not having appropriate authorization.

Figure 10:
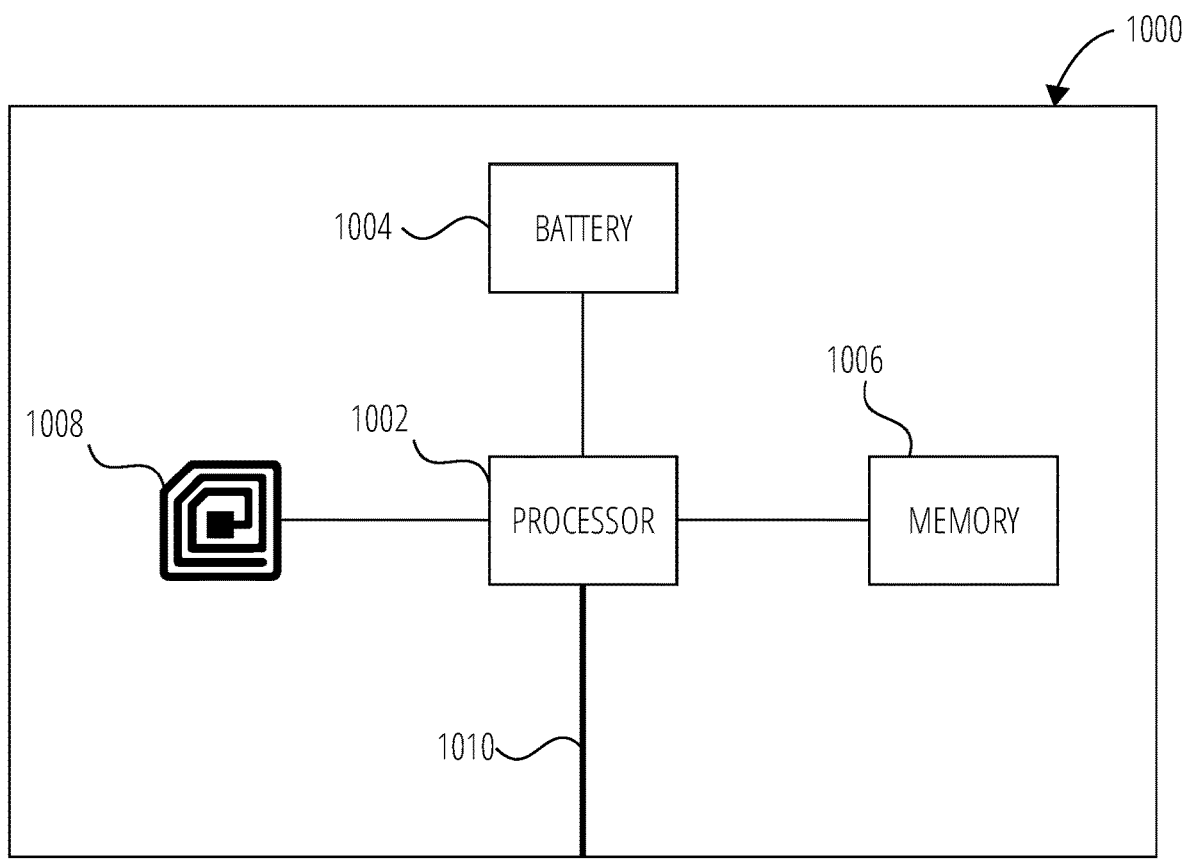
FIG. 10 illustrates a transmitting tag/non-listener tag 1000 in accordance with one embodiment.

FIG. 10 illustrates a transmitting tag/non-listener tag 1000 according to an embodiment of the present disclosure. The transmitting tag/non-listener tag 1000 may comprise a processor 1002, a small battery 1004, memory 1006, a transmitter 1008, and a tamper wire 1010. In this embodiment, the transmitting tag/non-listener tag 1000 transmits but does not receive. Thus, rather than a transceiver, a transmitter 1008 may be used for broadcasting functionality.

The processor 1002 may detect a mild current that transmitted through the tamper wire 1010. If the tamper wire 1010 is severed or otherwise damaged, the processor 1002 may detect that the current is no longer received. The processor 1002 may then send an appropriate message in its advertising packet(s) indicating that tamper wire 1010 may have been severed.

Figure 11:
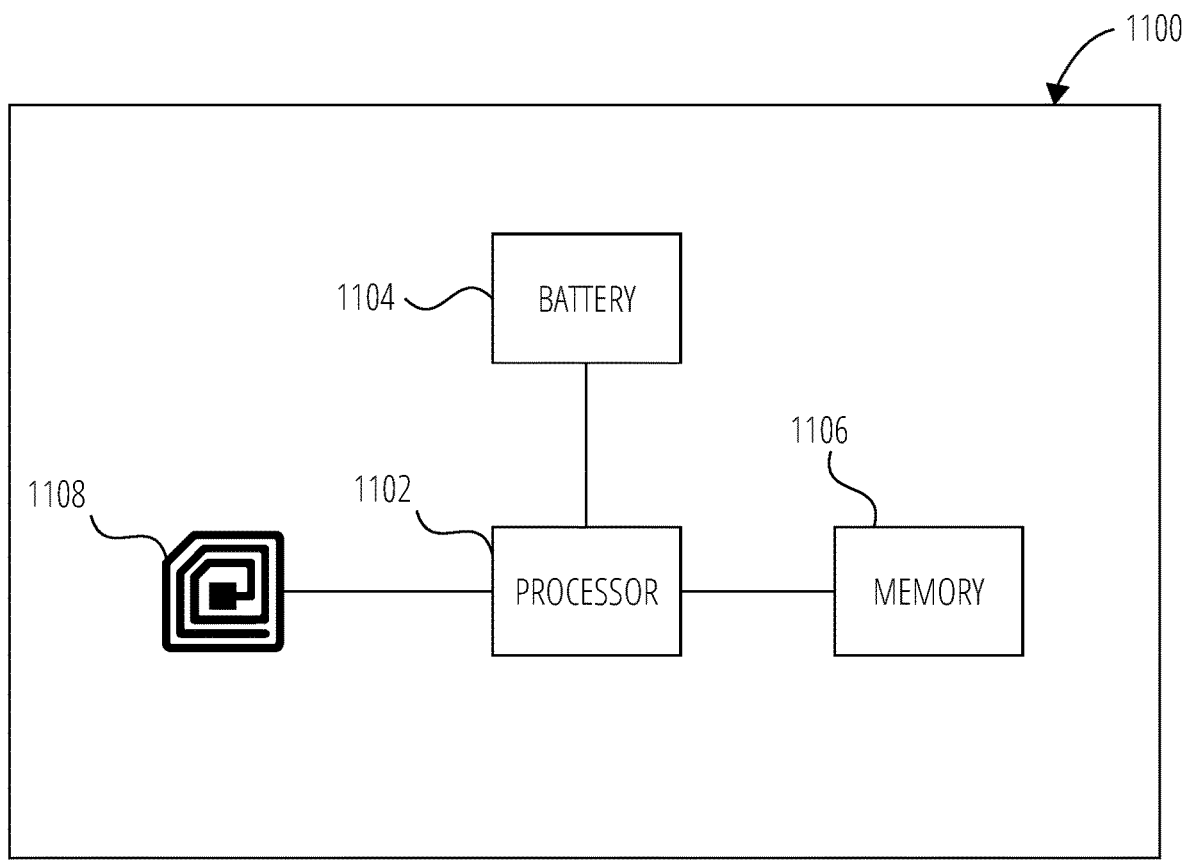
FIG. 11 illustrates a transceiver tag/listener tag 1100 in accordance with one embodiment.

FIG. 11 illustrates a transceiver tag/listener tag 1100 in accordance with one embodiment. Similar to the transmitting tag/non-listener tag 1000, the transceiver tag/listener tag 1100 may comprise a processor 1102, a battery 1104 (which may be larger than the battery 1004 of the transmitting tag/non-listener tag 1000), and memory 1106.

Unlike the transmitting tag/non-listener tag 1000, the transceiver tag/listener tag 1100 may include a transceiver 1108 capable of both transmitting and receiving beacon signals. The transceiver tag/listener tag 1100 may receive communications from other transceiver tag/listener tags 1100 as well as transmitting tag/non-listener tags 1000. The transceiver tag/listener tag 1100 may send communications received from transmitting tag/non-listener tags 1000, as well as RSSIs indicative of their relative position, to other listeners such as gateways, mobile devices, and other transceiver tag/listener tags 1100.

Though not illustrated in this figure, in some embodiments a transceiver tag/listener tag 1100 may further comprise a visual display capable of displaying information in the form of text or graphics as well as visual alarms, a haptic actuator capable of providing haptic alarms, speakers capable of providing audible alarms and other audio output, a microphone, a touch screen, buttons, dials, switches, LEDs that may provide visual alarms, and other components. These components may facilitate user notification and interaction through touch, typing, and voice recognition, as is well understood by those skilled in the art.

User input mechanisms may in some embodiments act to snooze or deactivate alerts generated by the tag, for either a period of time, or until some new condition is met, such as the user input mechanism being engaged again.

Figure 12:
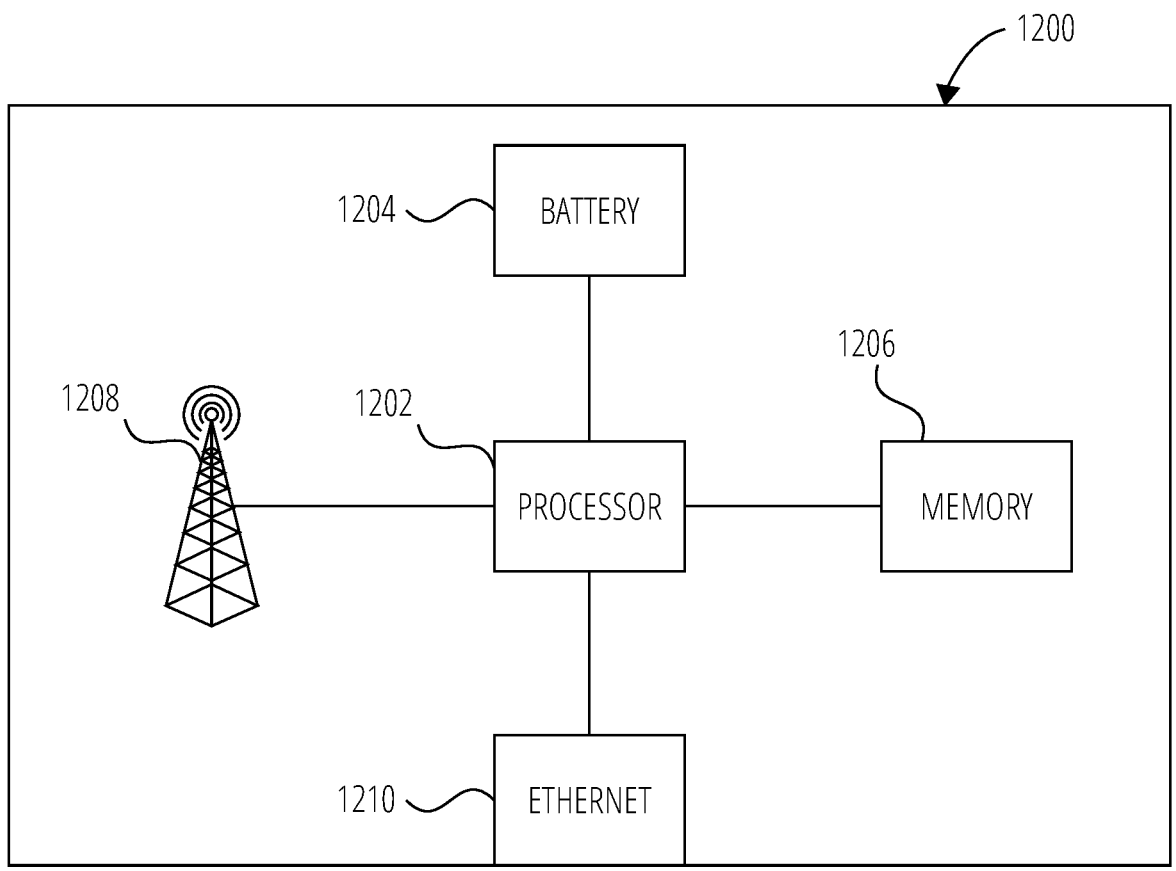
FIG. 12 illustrates a gateway 1200 in accordance with one embodiment.

FIG. 12 is an architectural diagram illustrating a gateway 1200, according to an embodiment of the present disclosure. In this embodiment, the gateway 1200 has a processor 1202, a battery 1204, memory 1206, and a transceiver 1208. However, in some embodiments, the gateway 1200 may have a wired AC power source in addition to or in lieu of battery 1204. Gateway 1200 may also have an ethernet 1210 card to communicate with one or more servers via the Internet. In some embodiments, gateway 1200 may communicate with the Internet and/or a cellular network via transceiver 1208.

Figure 13:
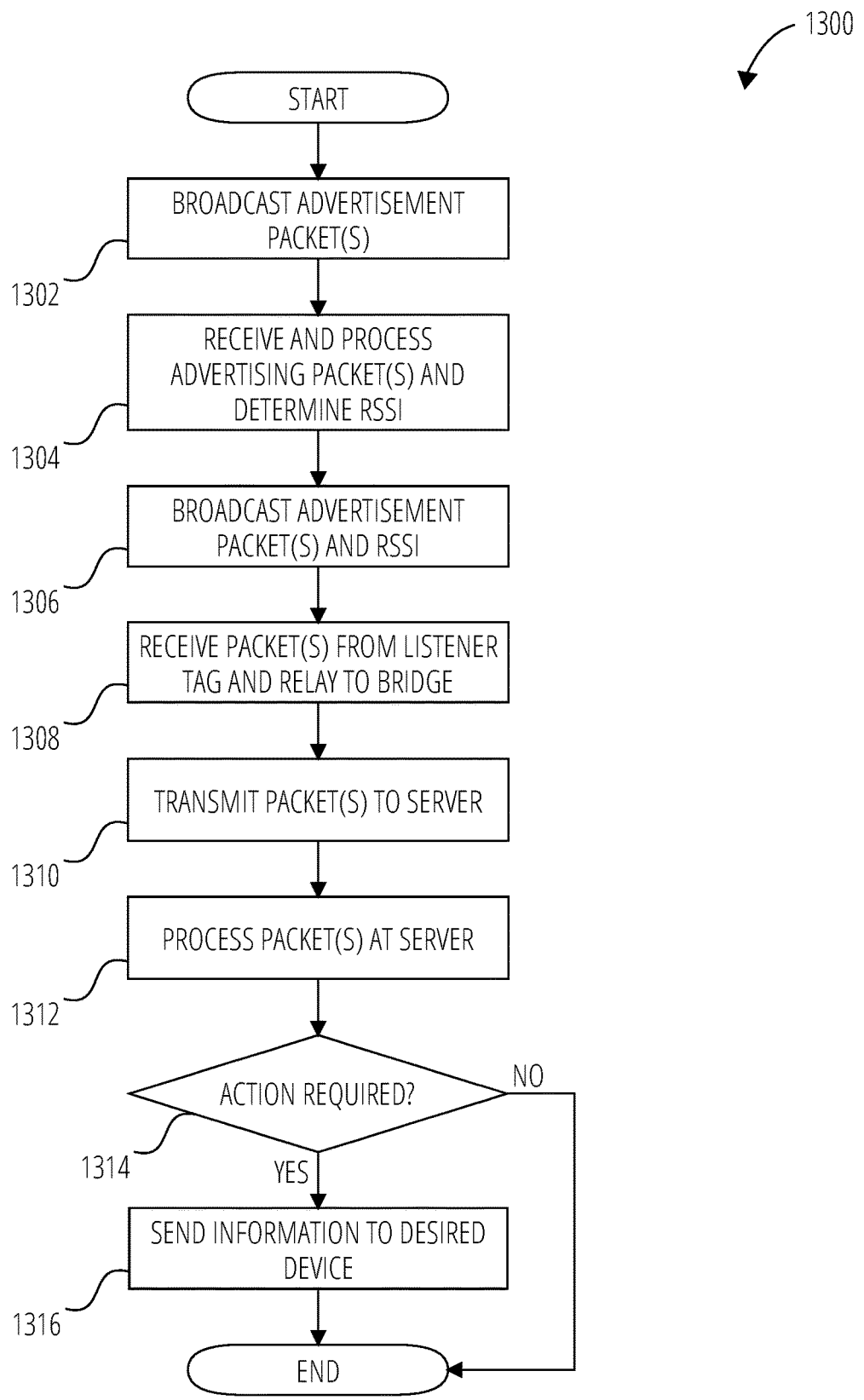
FIG. 13 illustrates a flowchart of a process 1300 for detecting a location of a non-listener tag and a proximity to a listener tag in accordance with one embodiment.

FIG. 13 is a flowchart illustrating a process 1300 for detecting a location of a non-listener tag and a proximity to a listener tag, according to an embodiment of the present disclosure. The process begins with a non-listener tag broadcasting advertisement packet(s) at 1302. A nearby listener tag receives the advertisement packet(s), processes the packet(s) to determine that the source is a non-listener tag (e.g., via an identifier in the header), and determines the RSSI at 1304. The listener tag then broadcasts this information to be received by a nearby listener at 1306.

The listener receives the packets(s) and relays them to a bridge at 1308 through other listeners, if needed. The bridge receives the packets and transmits them to s server at 1310. The server processes the packet(s) at 1312 by decrypting the payload(s) thereof determining the RSSI and location of the non-listener tag. For instance, the location may be determined by calculating the coordinates of the position by taking different RSSI values of a tag detected by available listeners. The server may also determine the proximity of the listener tag to the non-listener tag, and if they represent an associated mother and infant, the server increments the amount of time that the mother and infant are proximate to one another so long as this remains the case. If further action is needed at 1314 (e.g., the server should send information or an alert to one or more devices) the server sends the desired information and/or alert to the appropriate device(s) at 1316.

Figure 14:
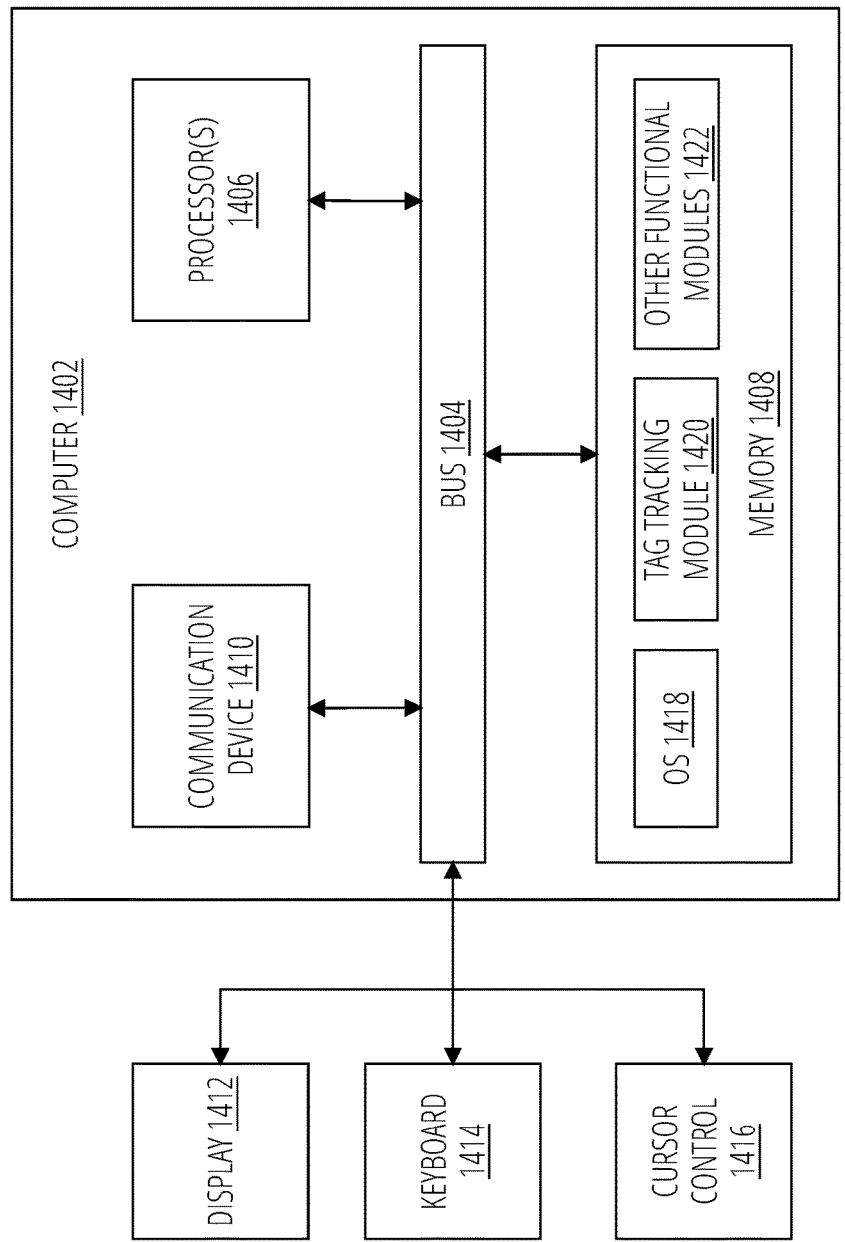
FIG. 14 is a block diagram illustrating a computing system 1400 configured to perform operations associated with a tag tracking system accordance with one embodiment.

FIG. 14 illustrates a computing system 1400 in accordance with one embodiment. The computing system 1400 comprises a computer 1402, a bus 1404, a processor(s) 1406, a memory 1408, a communication device 1410, a display 1412, a keyboard 1414, a cursor control 1416, an operating system 1418, a tag tracking module 1420, and other functional modules 1422. The computing system 1400 may be configured to perform operations associated with a tag tracking system, according to an embodiment of the present disclosure. For instance, computing system 1400 may be a server, a personal computer, a tablet, a mobile device, or any other suitable computing system without deviating from the scope of this disclosure.

Computing system 1400 may include a bus 1404 or other communication mechanism for communicating information, and processor(s) 1406 coupled to bus 1404 for processing information. Processor(s) 1406 may be any type of general or specific purpose processor, including a central processing unit (CPU) or application specific integrated circuit (ASIC). Processor(s) 1406 may also have multiple processing cores, and at least some of the cores may be configured to perform specific functions. Multi-parallel processing may be used in some embodiments. Computing system 1400 may further include a memory 1408 for storing information and instructions to be executed by processor(s) 1406. Memory 1408 may comprise any combination of random access memory (RAM), read only memory (ROM), flash memory, cache, static storage such as a magnetic or optical disk, or any other types of non-transitory computer-readable media or combinations thereof. Additionally, computing system 1400 may include a communication device 1410, such as a transceiver and antenna, to wirelessly provide access to a communications network.

Non-transitory computer-readable media may be any available media that may be accessed by processor(s) 1406 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 1406 are further coupled via bus 1404 to a display 1412, such as a Liquid Crystal Display (LCD), for displaying information to a user. A keyboard 1414 and a cursor control 1416 device, such as a computer mouse, are further coupled to bus 805 to enable a user to interface with computing system. However, in certain embodiments such as those for mobile computing implementations, a physical keyboard and mouse may not be present, and the user may interact with the device solely through display 825 via a haptic interface and/or a touchpad (not shown), or through no interface at all (e.g., where a device has an "on" button and no other controls). As such, display 1412, keyboard 1414, and/or cursor control 1416 may not be present in some computing systems. Any type and combination of input devices may be used as a matter of design choice.

Memory 815 stores software modules that provide functionality when executed by processor(s) 1406. The modules include an operating system 1418 for computing system 1400. The modules further include a tag tracking module 1420 that is configured to perform any, or any part of, the location tracking, monitoring, and alerting approaches discussed herein or derivatives thereof. Computing system 800 may include one or more additional other functional modules 1422 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present disclosure in any way, but is intended to provide one example of many embodiments of the present disclosure. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process 1300 steps performed in FIG. 13 may be performed by a computer program, encoding instructions for the nonlinear adaptive processor to perform at least the process 1300 described in FIG. 13, in accordance with embodiments of the present disclosure. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the process 1300 described in FIG. 13, which may also be stored on the computer-readable medium.

The computer program may be implemented in hardware, software, or a hybrid implementation. The computer program may be composed of modules that are in operative communication with one another, and which are designed to pass information or instructions to display. The computer program may be configured to operate on a general purpose computer, or an ASIC.

Figure 15:
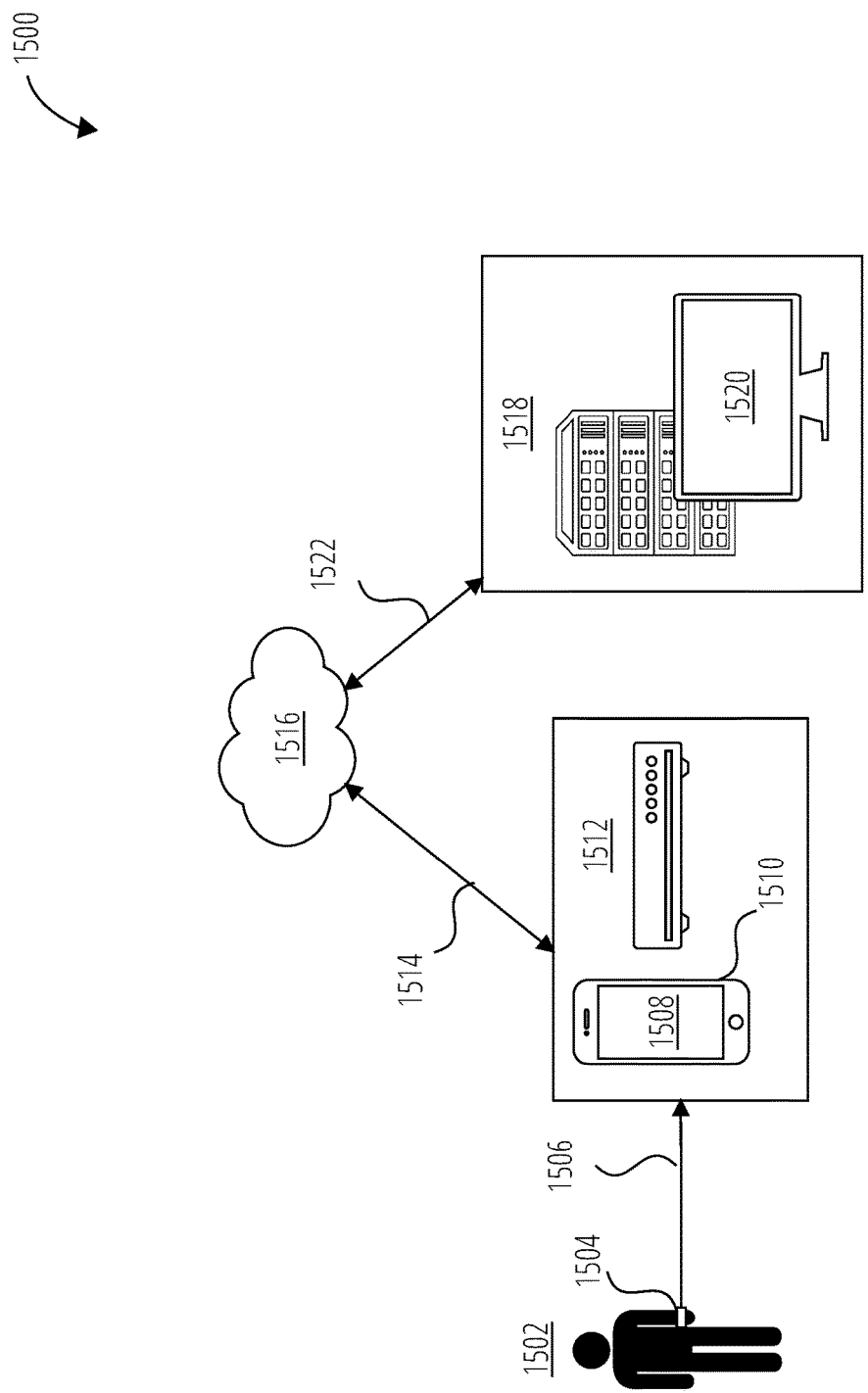
FIG. 15 illustrates a quarantine system 1500 in accordance with one embodiment.

FIG. 15 illustrates a quarantine system 1500 in accordance with one embodiment. The quarantine system 1500 may comprise a quarantined user 1502, a tamper-proof tag 1504, a mobile application 1508, a cloud integration 1516, and a central monitoring system 1518 running a web application 1520.

The tamper-proof tag 1504 may send tag identifiers and alerts 1506 based on its configuration and detected proximity of other tags to the mobile application 1508 installed on a mobile device 1510 belonging to the quarantined user 1502, or on a gateway 1512 device. The mobile application 1508 may in turn send GPS-based tag location, time, notifications, and onboarding data 1514 to the cloud integration 1516 via the Internet.

The cloud integration 1516 may in some embodiments include cloud storage, as well as analysis algorithms deployed on cloud servers. In other embodiments, the cloud integration 1516 may act as a pass through for data from multiple installations of the mobile application 1508.

The cloud integration 1516 may pass raw or processed data in the form of tag location, time, notifications, and alerts 1522 to a central monitoring system 1518. The central monitoring system 1518 may run a web application 1520 allowing monitoring personnel access to a data dashboard page, alerts, reports, and analytics based on data received from the cloud integration 1516.

Figure 16:
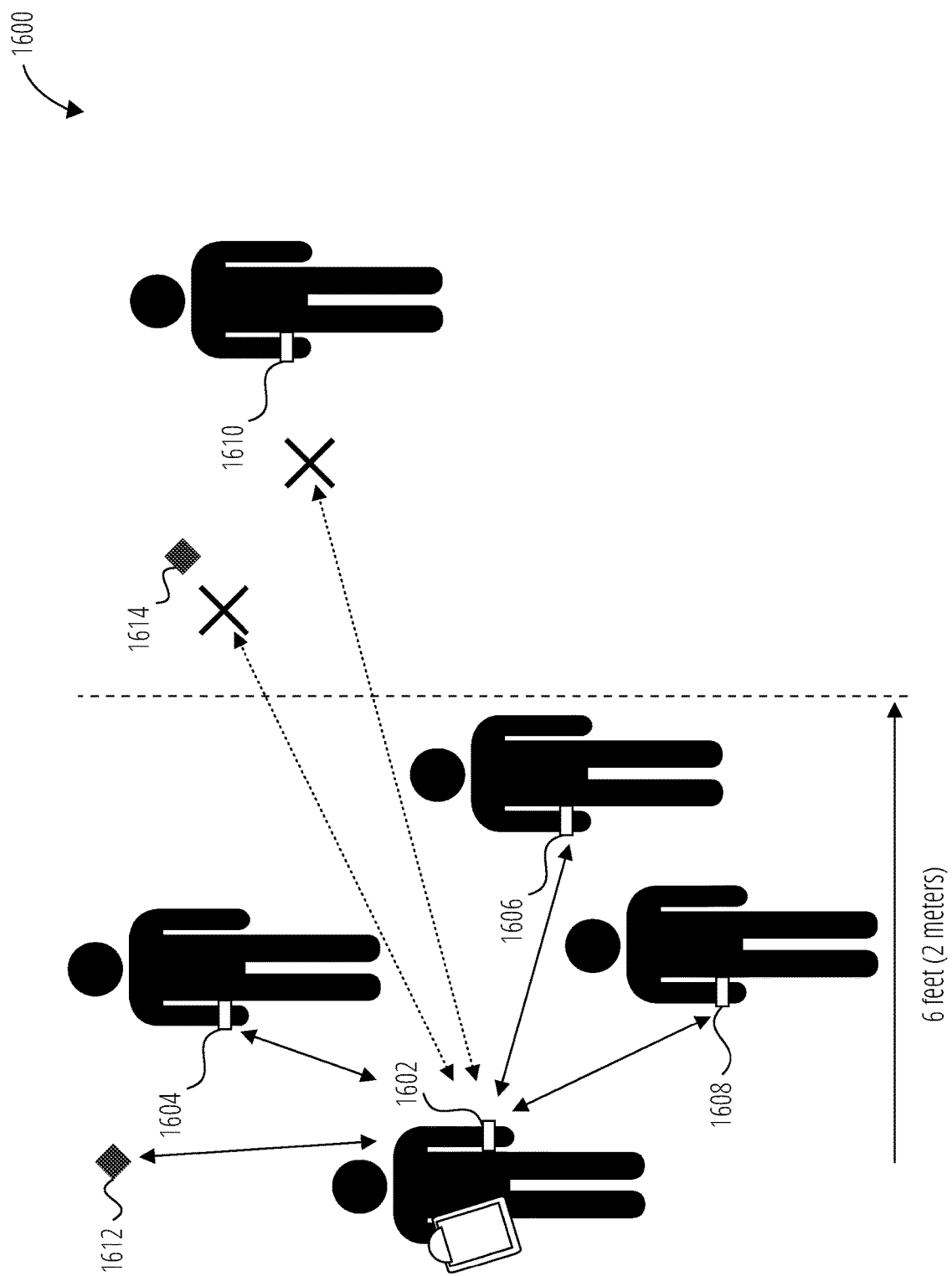
FIG. 16 illustrates use of listener tags 1600 in accordance with one embodiment.

FIG. 16 illustrates use of listener tags 1600 for a contact tracing application in accordance with one embodiment. A system using listener tags may comprise users wearing transceiver tags 1602-1610 and static beacons 1612 and 1614 as shown. Transceiver tags 1602-1610 may be configured both transmit and receive beacon data packets, and static beacons 1612 and 1614 may be configured to transmit beacon packets, so that their presence and the corresponding time may be recorded.

Signals from any electronic tags within radio range of transceiver tag 1602 may be received, including signals from transceiver tag 1604, transceiver tag 1606, transceiver tag 1608, transceiver tag 1610, static beacon 1612, and static beacon 1614. Based on received signal strength (RSSI), the distance between two electronic tags may be estimated. Because each tag carries real-time clock functionality, a timestamp for contact may also be recorded. Common healthcare guidelines indicate that distance and time duration between two people may be recorded, and if the cumulative duration of contact within a certain distance over a certain period exceeds a threshold, the two people are considered to have been in close contact. Thus two people wearing the tags may be monitored for close contact, using the data records from the two tags. Based on an RSSI value for signals detected from other transceiver tags, each of transceiver tags 1602-1610 may receive and record beacon signals within a configured close contact range for a particular contagious pathogen, such as COVID-19. The Center for Disease Control (CDC) defines "close contact" as a) being within approximately 6 feet (2 meters) of a COVID-19 case for a prolonged period of time; close contact may occur while caring for, living with, visiting, or sharing a health care waiting area or room with a COVID-19 case;—or—b) having direct contact with infectious secretions of a COVID-19 case (e.g., being coughed on).

RSSI values may be obtained by a transceiver tag by analyzing the beacon signals it receives, applying a smoothing filter to those signals, such as averaging the signal strength over time, and by assessing the strength of received beacon signals, in a manner that is well understood by those skilled in the art. If the RSSI value of a received beacon signal exceeds a configured RSSI contact threshold, the beacon signal may be considered as indicating another electronic tag is present within a configured proximity range.

In one embodiment transceiver tag 1602 may receive and record all beacons within 6 feet (2 meters), based on the RSSI value for signals received from transceiver tags and static beacons, such as transceiver tag 1604, transceiver tag 1606, transceiver tag 1608, and static beacon 1612. Transceiver tag 1602 may also transmit beacon signals for other electronic tags to detect and record its presence. However, transceiver tag 1610 and static beacon 1614, being located more than 6 feet (2 meters) away from transceiver tag 1602, may send beacon signals that may be detected by transceiver tag 1602, but their lower RSSI value may indicate that they fall outside of the close contact area of concern, and as such, these beacon signals may not result in a contact being recorded by transceiver tag 1602. This may facilitate power saving during normal operations, as well as preventing storage space within the transceiver tag from being filled with data pertaining to contacts that are not close enough to be of interest.

The RSSI contact threshold which a detected beacon signals RSSI value may need to exceed for a contact to be recorded may be set by a server every time a transceiver tag connects to that server. In this manner, the RSSI contact threshold may be set when the transceiver tag is registered for use on the server, and may be changed each time the transceiver tag uploads its recorded data. In some embodiments, there may be multiple RSSI contact thresholds set for a device, and different recording and alert actions taken when each RSSI contact threshold is exceeded. In another embodiment, different devices may receive different RSSI contact thresholds, such as a 6-foot (2-meter) threshold for wearable transceiver tags and a maximum signaling range threshold for fixed locators or location beacons, such as the static beacons shown.

For contact-tracing of COVID-19 exposure for example, the objective is to detect close contact within 6 feet (2 meters) with accumulated time of more than 15 minutes over any 24 hour period. The transceiver tags may thus be configured to have time resolution of 30 seconds by setting a contact window of 30 seconds, with scan period of 10 seconds and scan duty cycle of 10% (as described in detail with respect to FIG. 6). An advertising interval of 100 ms and an RSSI contact threshold of −65 dBm may allow a sufficient number of packets to be received every scan period if two transceiver tags come within 6 feet (2 meters) of each other for that time duration. The 10% duty cycle may reduce power consumption significantly.

Transceiver tags 1602-1610 may also be used to provide social distancing alerts during times when the close contact condition is met and a contact record is created. The alert may be in the form of sound, vibration, and light indications, so that users wearing the tags are alerted that they are close to each other for the time period of the contact window. Determination of contact windows is described in greater detail with respect to FIG. 18.

Figure 17:
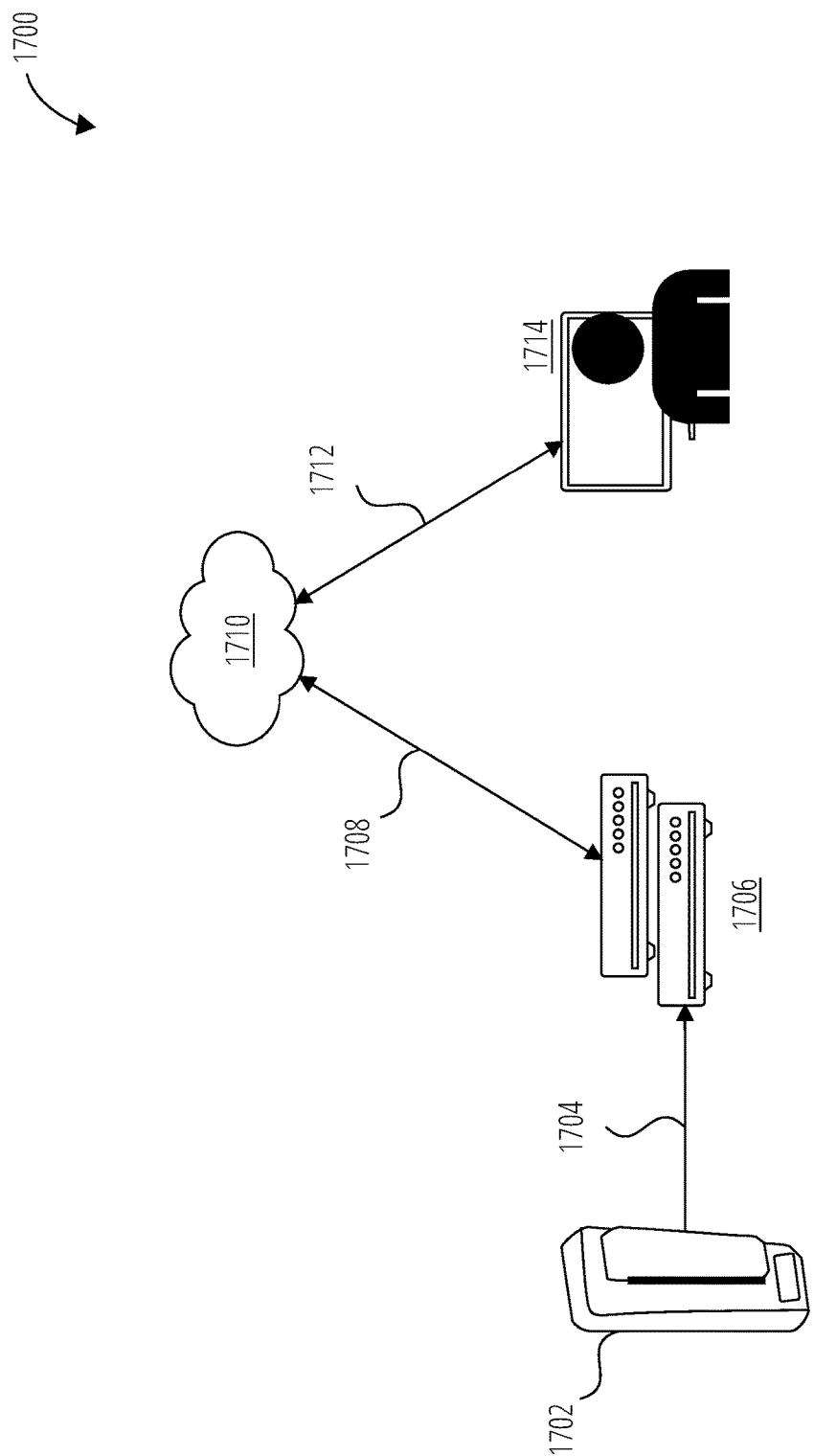
FIG. 17 illustrates an electronic tag connecting with gateways 1700 in accordance with one embodiment.

FIG. 17 illustrates an electronic tag connecting with gateways 1700 in accordance with one embodiment. A clip-on transceiver tag assigned to staff 1702 may connect to gateways 1706 in order to send data to a cloud integration 1710, which then sends data to a site administrator 1714.

A personnel member may wear a clip-on transceiver tag assigned to staff 1702 as they work in a particular location. The tag may in some embodiments be integrated within a wrist band, a badge, a mobile device application, or some other device as disclosed herein. The clip-on transceiver tag assigned to staff 1702 may send social distance alert, interaction history, and low battery alert 1704 data to gateways 1706 within a configured proximity. The gateways 1706 may send device IDs 1708 to the cloud integration 1710, along with other data, for storage and analysis. The cloud integration 1710 may process data received into interaction details 1712 such as date and time, location, proximity of other tags detected, and duration of contact with other tags. The interaction details 1712 may be viewed by the site administrator 1714 on a computer application having a dashboard and displaying alerts and notifications, contact mapping analytics, and attendance integration. The gateways 1706 may also configure operational parameters for the clip-on transceiver tag assigned to staff 1702, as well as perform other maintenance functions such as firmware update and real-time clock synchronization.

In a real-life deployment, there may be many tags with few gateways, and the efficiency of data upload from tags may be impacted. A method to facilitate control to maintain efficiency is described here. First, the gateway may continuously broadcast beacon messages providing the following parameters that a tag may compare against its current conditions to decide if it should make connection to upload data: minimum contact records, time since last upload, and gateway RSSI limit. If the tag has created more than the minimum contact records, it may initiate a connection to upload the records. The time-since-last-upload is the maximum duration upon expiry of which a tag may initiate an upload, regardless of how many records it has created. The gateway RSSI limit may set the size of the gateway's coverage zone, such that tags may receive broadcast packets from gateways above this value before they connect to the gateway (i.e., the tag may be within a configured physical distance of the gateway before it may connect with that gateway). Typical values for these parameters are: 4 hours for time since last upload and 100 for minimum contact records. This may prevent tags from overwhelming a gateway while allowing contact tracing records to be updated frequently enough.

Figure 18:
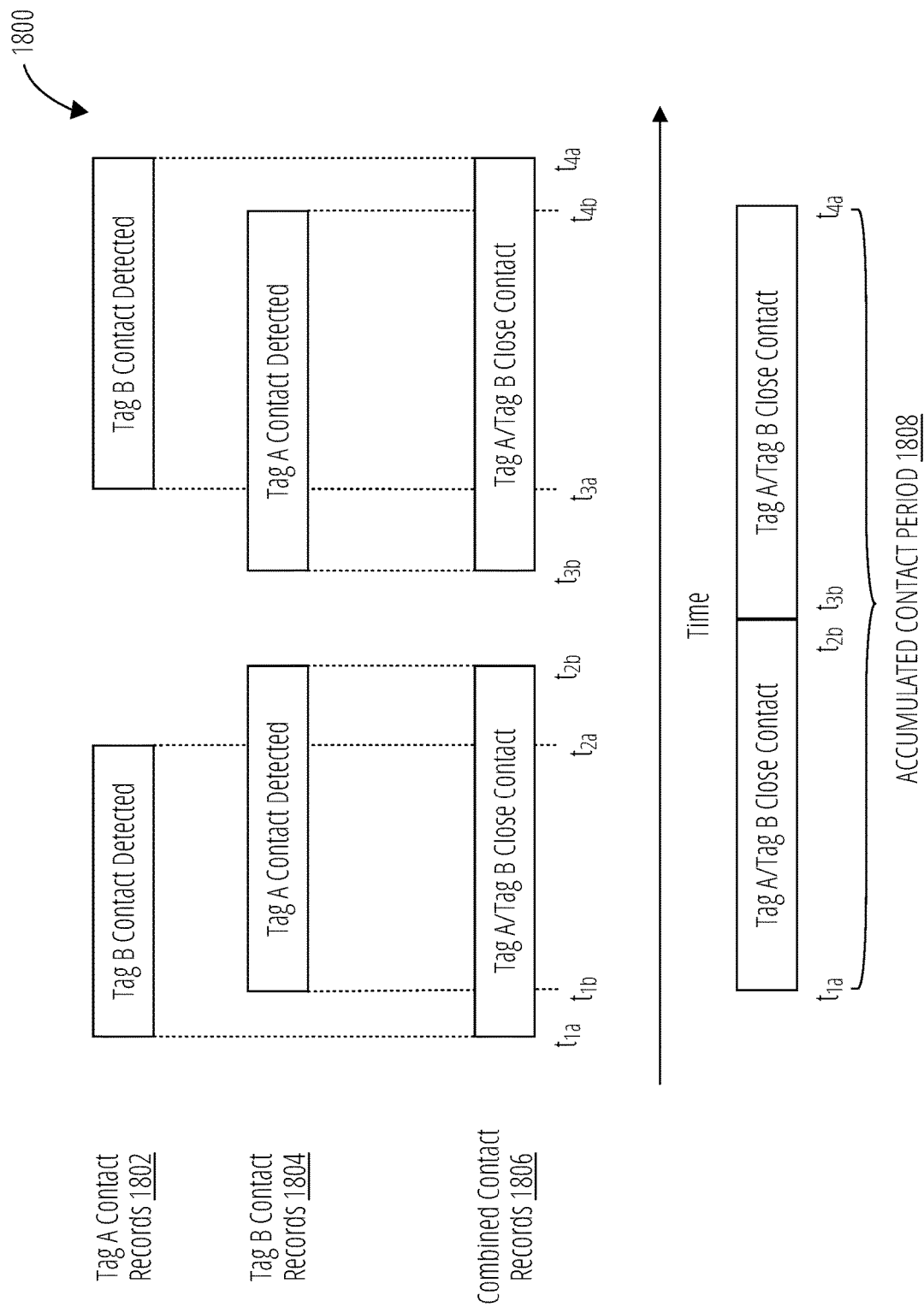
FIG. 18 illustrates combining tag contact records 1800 in accordance with one embodiment.

FIG. 18 illustrates an example of the action at the cloud server of combining tag contact records 1800 between two tags, Tag A and Tag B, into a single record.

For the contact records between two tags, each tag should theoretically contain the records of the other tag with same time duration and same start and stop times. In practice however due to slight differences in hardware and indoor environment, the records may be slightly different as illustrated in FIG. 18. The Tag A contact records 1802, for example, may indicate contact with Tag B from time $t_{1a}$ to time $t_{2a}$, while Tag B contact records 1804 may indicate contact with Tag A beginning at a time $t_{1b}$ slightly later than time $t_{1a}$, and ending at time $t_{2b}$, at some point after time $t_{2a}$. A later contact between the two tags may begin at time $t_{3b}$ and end at time $t_{4b}$ according to Tag B, but may be indicated as beginning at time $t_{3a}$ which falls after time $t_{3b}$, and end at time $t_{4a}$, later than time $t_{4b}$.

The post-processing at the cloud server therefore may combine the records indicating a mutual contact between Tag A and Tag B, so that the union or superset of all records are generated as the combined output, which will be more accurate than taking just any one of the tag's records alone. This, the combined contact records 1806 may indicate that the first close contact between the tags began at $t_{1a}$ and ended at time $t_{2b}$. The second close contact may be indicated as beginning at time $t_{3b}$ and ending at time $t_{4a}$.

The cloud server may further sum or otherwise combine the two contact times (time $t_{1a}$ to $t_{2b}$ plus time tab to $t_{4a}$) to create an accumulated contact period 1808.

A contact record is created whenever the RSSI contact threshold is exceeded within any contact window time period, and is closed when the RSSI contact threshold is no longer met. The average RSSI and the start and stop times are recorded, so that a close contact event creates one record, regardless of how long the duration lasts, resulting in very efficient storage needed on the tag itself. A typical record may take up 20 bytes of memory, thus a busy worker with 500 contacts per day may create 10K bytes of records, which may be efficiently uploaded to the server.

Figure 19:
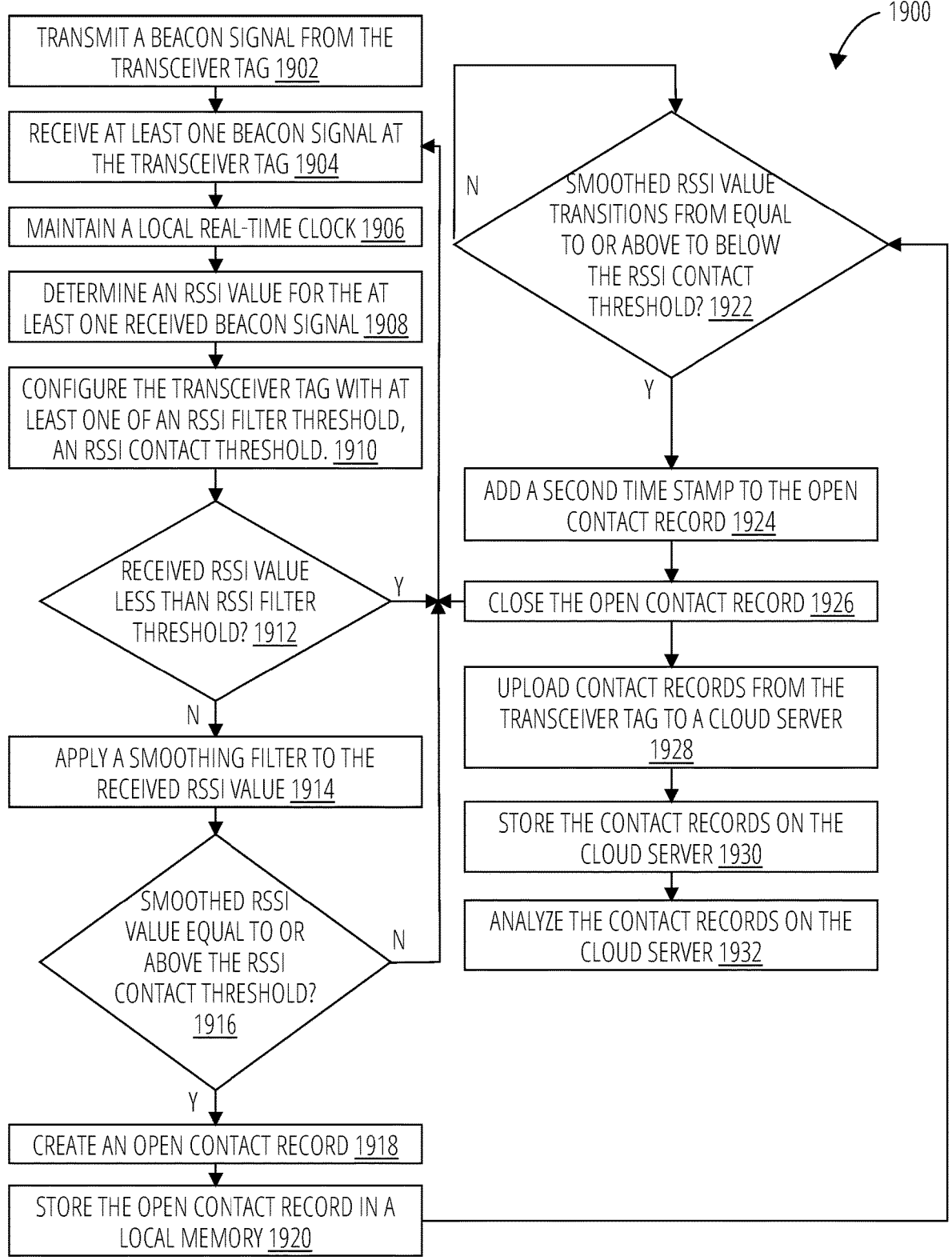
FIG. 19 illustrates a routine 1900 in accordance with one embodiment.

FIG. 19 illustrates a routine 1900 for performing the method disclosed herein in accordance with one embodiment. Routine 1900 begins at block 1902 with transmitting beacon signals from a transceiver tag. Beacon signals may comprise data packets that include at least a device ID for the transceiver tag.

In block 1904, routine 1900 receives at the transceiver tag at least one received beacon signal from at least one of another transceiver tag, a transmitting tag, a gateway, a mobile device, and a static beacon. The beacon signals may conform to a standard Bluetooth Low Energy beacon protocol, such as iBeacon™, AltBeacon℠, URIBeacon, and Eddystone™.

In block 1906, routine 1900 maintains a local real-time clock. The local real-time clock may be included in the transmitted data packets, and may be used to determine contact times as described in further detail below. In some embodiments, a global real-time clock value included in received data packets may be used to update a local real-time clock that has become out of sync, such that relative time may be kept, and records created while out of sync may be back dated correctly.

In block 1908, routine 1900 determines a received signal strength indicator (RSSI) value for the at least one received beacon signal. The RSSI value may correlate to a physical distance between the transceiver tag receiving the signal in block 1904 and the transmitter sending the beacon signal.

In block 1910, routine 1900 configures the transceiver tag with tag operating parameters, the tag operating parameters configurable and including at least one of an advertising interval, a contact window, a scan period, a scan duty cycle, an RSSI filter threshold, and an RSSI contact threshold.

In decision block 1912, routine 1900 determines whether the received RSSI value is below the RSSI filter threshold. If the received RSSI value is below the RSSI filter threshold, no action may be taken, and the received beacon signal may be ignored. If the received beacon signal RSSI value is at or above the RSSI filter threshold, a smoothing filter may be applied in block 1914. The smoothing filter may be a mean average or some other smoothing algorithm well understood by those skilled in the art.

At decision block 1916, routine 1900 determines whether the smoothed RSSI value of the received beacon signal is equal to or above the RSSI contact threshold. If it is not, no action may be taken and the received beacon signal may be ignored. If it is, routine 1900 creates an open contact record at block 1918. The open contact record may comprise a received device ID from the data packets of the received beacon signal, the smoothed RSSI value of the received beacon signal, and a first time stamp. In block 1920, routine 1900 stores the open contact record in a local memory. In some embodiments, the open contact record may further comprise the secondary data received from the mobile device or the gateway. Secondary data may include GPS coordinates, WiFi network SSID, other devices connected to the WiFi network, WiFi networks scanned, BLE devices scanned, other WiFi data, gyroscope readings, accelerometer readings, barometric pressure readings, and other sensor data.

In decision block 1922, routine 1900 determines whether the smoothed RSSI value transitions from equal to or above the RSSI contact threshold to below the RSSI contact threshold. If it does not, no action is taken, and decision block 1922 may be repeated any number of times. If it does, in block 1924, routine 1900 adds a second time stamp to the open contact record. In block 1926, routine 1900 closes the open contact record to create a contact record. The first and second time stamps may indicate a start of close contact and an end of close contact in one embodiment.

In block 1928, routine 1900 uploads contact records from the transceiver tag to a cloud server. Contact records may be uploaded through a gateway, a mobile device, or some other device able to connect the transceiver tag to the Internet. In block 1930, routine 1900 stores the contact records on the cloud server. In block 1932, routine 1900 analyzes the contact records on the cloud server. Analysis may include operations described in greater detail with respect to FIG. 18.

Figure 20:
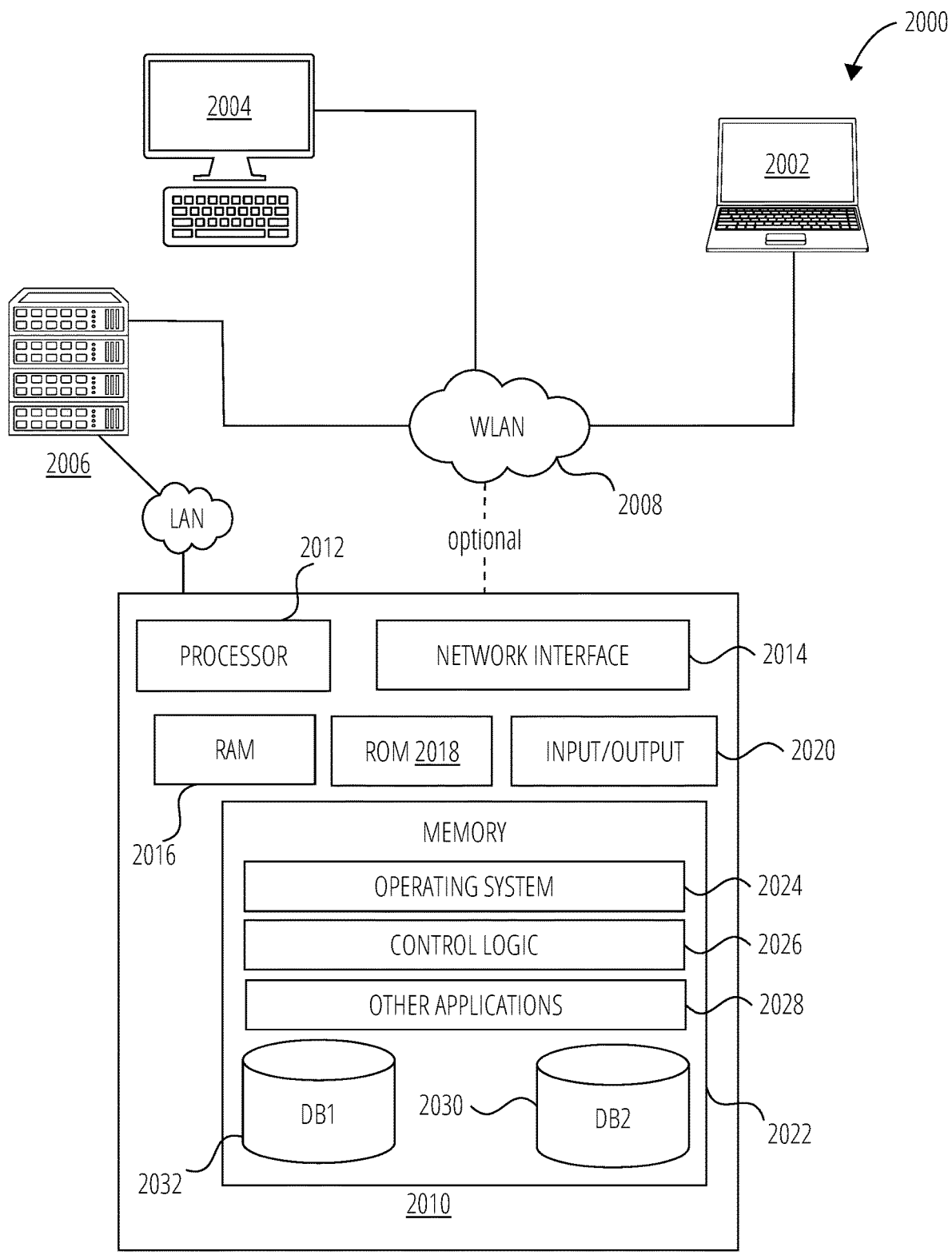
FIG. 20 depicts an illustrative computer system architecture 2000 that may be used in accordance with one or more illustrative aspects described herein.

FIG. 20 illustrates one example of a system architecture and data processing device that may be used to implement one or more illustrative aspects described herein in a stand-alone and/or networked environment. Various network nodes including data server 2010, web server 2006, computer 2004, and laptop 2002 may be interconnected via a wide area network 2008 (WAN), such as the internet. Other networks may also or alternatively be used, including private intranets, corporate networks, LANs, metropolitan area networks (MANs) wireless networks, personal networks (PANs), and the like. Network 2008 is for illustration purposes and may be replaced with fewer or additional computer networks. A local area network (LAN) may have one or more of any known LAN topology and may use one or more of a variety of different protocols, such as ethernet. Devices including data server 2010, web server 2006, computer 2004, laptop 2002 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components of the illustrative computer system architecture 2000 may include data server 2010, web server 2006, and client computer 2004, laptop 2002. Data server 2010 provides overall access, control and administration of databases and control software for performing one or more illustrative aspects described herein. Data server 2010 may be connected to web server 2006 through which users interact with and obtain data as requested. Alternatively, data server 2010 may act as a web server itself and be directly connected to the internet. Data server 2010 may be connected to web server 2006 through the network 2008 (e.g., the internet), via direct or indirect connection, or via some other network. Users may interact with the data server 2010 using remote computer 2004, laptop 2002, e.g., using a web browser to connect to the data server 2010 via one or more externally exposed web sites hosted by web server 2006. Client computer 2004, laptop 2002 may be used in concert with data server 2010 to access data stored therein, or may be used for other purposes. For example, from client computer 2004, a user may access web server 2006 using an internet browser, as is known in the art, or by executing a software application that communicates with web server 2006 and/or data server 2010 over a computer network (such as the internet).

Servers and applications may be combined on the same physical machines, and retain separate virtual or logical addresses, or may reside on separate physical machines. FIG. 20 illustrates just one example of a network architecture that may be used, and those of skill in the art will appreciate that the specific network architecture and data processing devices used may vary, and are secondary to the functionality that they provide, as further described herein. For example, services provided by web server 2006 and data server 2010 may be combined on a single server.

Each component including data server 2010, web server 2006, computer 2004, laptop 2002 may be any type of known computer, server, or data processing device. Data server 2010, e.g., may include a processor 2012 controlling overall operation of the data server 2010. Data server 2010 may further include RAM 2016, ROM 2018, network interface 2014, input/output interfaces 2020 (e.g., keyboard, mouse, display, printer, etc.), and memory 2022. Input/output interfaces 2020 may include a variety of interface units and drives for reading, writing, displaying, and/or printing data or files. Memory 2022 may further store operating system software 2024 for controlling overall operation of the data server 2010, control logic 2026 for instructing data server 2010 to perform aspects described herein, and other application software 2028 providing secondary, support, and/or other functionality which may or may not be used in conjunction with aspects described herein. The control logic may also be referred to herein as the data server software control logic 2026. Functionality of the data server software may refer to operations or decisions made automatically based on rules coded into the control logic, made manually by a user providing input into the system, and/or a combination of automatic processing based on user input (e.g., queries, data updates, etc.).

Memory 2022 may also store data used in performance of one or more aspects described herein, including a first database 2030 and a second database 2032. In some embodiments, the first database may include the second database (e.g., as a separate table, report, etc.). That is, the information can be stored in a single database, or separated into different logical, virtual, or physical databases, depending on system design. Web server 2006, computer 2004, laptop 2002 may have similar or different architecture as described with respect to data server 2010. Those of skill in the art will appreciate that the functionality of data server 2010 (or web server 2006, computer 2004, laptop 2002) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

LISTING OF DRAWING ELEMENTS 100 power-saving via RSSI
102 gateway
104 transceiver tags within system configured proximity
106 transceiver tags within signal range but outside of system configured proximity
108 transceiver tag outside of configured proximity and outside of signal range
200 public health system
202 quarantined person
204 transceiver tag wrist band
206 mobile device
208 encrypted beacon signals
210 send data
212 public health cloud
214 public person
216 mobile device
218 encrypted beacon signals
220 forwarded on
222 alert notification
300 public health system
302 GPS coordinates
304 forward these coordinates
306 risky zone alert
400 public health system
402 dedicated beacon listener device
404 wired or wireless internet connection
406 warning message
408 encrypted beacon signals
410 elevate warning levels
500 office building tracking system
502 office
504 restroom
506 elevator
508 stairwell
510 corridor
512 open workspace
514 break room
516 conference room
518 personnel with transceiver tag
520 personnel with control application
522 static beacon
524 gateway
526 internet
528 server
530 transceiver tag
532 transceiver tag
534 mobile device 536 contact tracing
538 record upload
600 listener tag timing operation
602 contact window
604 scan period
606 receiving time
700 mobile device
702 mobile device tracking application
704 map
706 user
708 contact within configured proximity
710 social distancing alert
712 warning message
800 maternity ward tracking system
802 alarm zone
804 safe zone
806 delivery room
808 elevator
810 stairwell
812 viewing room
814 nursery
816 equipment room
818 listener
820 gateway
822 internet
824 server
826 infant
828 mother
830 staff member
832 non-listener tag
834 band
836 wire
838 listener tag
840 staff tag
842 mobile device
900 mobile device
902 mobile device tracking application
904 map
906 infant
908 mother
910 staff member
912 listener
914 selection circle
916 information panel
918 message
920 send button
922 indicator circle
924 message
926 location indicator
928 alert message
1000 transmitting tag/non-listener tag
1002 processor
1004 battery
1006 memory
1008 transmitter
1010 tamper wire
1100 transceiver tag/listener tag
1102 processor
1104 battery
1106 memory
1108 transceiver
1200 gateway
1202 processor
1204 battery
1206 memory
1208 transceiver
1210 ethernet 1300 process
1302 block
1304 block
1306 block
1308 block
1310 block
1312 block
1314 decision block
1316 block
1400 computing system
1402 computer
1404 bus
1406 processor(s)
1408 memory
1410 communication device
1412 display
1414 keyboard
1416 cursor control
1418 operating system
1420 tag tracking module
1422 other functional modules
1500 quarantine system
1502 quarantined user
1504 tamper-proof tag
1506 tag identifiers and alerts
1508 mobile application
1510 mobile device
1512 gateway
1514 GPS-based tag location, time, notifications, and onboarding data
1516 cloud integration
1518 central monitoring system
1520 web application
1522 tag location, time, notifications, and alerts
1600 use of listener tags
1602 transceiver tag
1604 transceiver tag
1606 transceiver tag
1608 transceiver tag
1610 transceiver tag
1612 static beacon
1614 static beacon
1700 electronic tag connecting with gateways
1702 clip-on transceiver tag assigned to staff
1704 social distance alert, interaction history, and low battery alert
1706 gateway
1708 device IDs
1710 cloud integration
1712 interaction details
1714 site administrator
1800 combining tag contact records
1802 Tag A contact records
1804 Tag B contact records
1806 combined contact records
1808 accumulated contact period
1900 routine
1902 block
1904 block
1906 block
1908 block
1910 block
1912 decision block
1914 block
1916 decision block
1918 block
1920 block 1922 decision block
1924 block
1926 block
1928 block
1930 block
1932 block
2000 illustrative computer system architecture
2002 laptop
2004 computer
2006 web server
2008 network
2010 data server
2012 processor
2014 network interface
2016 RAM
2018 ROM
2020 input/output interfaces
2022 memory
2024 operating system software
2026 control logic
2028 other application software
2030 first database
2032 second database It will be readily understood that the components of various embodiments of the present disclosure, as generally described and illustrated in the figures herein, may be arranged and designed in a wide variety of different configurations. Thus, the detailed description of the embodiments of the present disclosure, as represented in the attached figures, is not intended to limit the scope of this disclosure, but is merely representative of selected embodiments of the disclosure.

The features, structures, or characteristics of the disclosure described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present disclosure. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the disclosure as claimed. The scope of disclosed subject matter is not limited to the depicted embodiments but is rather set forth in the following Claims.

What is claimed is:

1. A method comprising:
transmitting from a transceiver tag a beacon signal, the beacon signal comprising data packets including at least a device ID for the transceiver tag;

receiving at the transceiver tag, at least one received beacon signal from at least one of another transceiver tag, a transmitting tag, a gateway, a mobile device, and a static beacon;
maintaining a local real-time clock;
determining a received signal strength indicator (RSSI) value for the at least one received beacon signal;
configuring the transceiver tag with tag operating parameters, the tag operating parameters configurable and including at least one of:
an advertising interval;
a contact window;
a scan period;
a scan duty cycle;
an RSSI filter threshold; and
an RSSI contact threshold;
on condition the RSSI value of the received beacon signal is below the RSSI filter threshold, ignoring the received beacon signal;
on condition the RSSI value of the received beacon signal is at least the RSSI filter threshold, applying a smoothing filter to the RSSI value to create a smoothed RSSI value;
on condition the smoothed RSSI value of the received beacon signal is at least the RSSI contact threshold:
creating an open contact record, the open contact record comprising a received device ID from the data packets of the received beacon signal, the smoothed RSSI value of the received beacon signal, and a first time stamp based on the local real-time clock; and
storing the open contact record in a local memory;
on condition the smoothed RSSI value of the received beacon signal transitions from at least the RSSI contact threshold to below the RSSI contact threshold:
adding a second time stamp, based on the local real-time clock, to the open contact record; and
closing the open contact record to create a contact record;
uploading contact records from the transceiver tag to a cloud server;
storing the contact records on the cloud server; and
analyzing the contact records on the cloud server.

2. The method of claim 1, wherein data packets received from at least one of the other transceiver tag, the gateway, and the mobile device further comprise a global real-time clock value and maintaining the local real-time clock comprises updating the local real-time clock with the global real-time clock value.

3. The method of claim 1, wherein the received beacon signals comprise data packets conforming to a Bluetooth Low Energy beacon standard protocol.

4. The method of claim 1, further comprising, on condition the RSSI value of the received beacon signal is equal to or above the RSSI contact threshold, alerting a transceiver tag user.

5. The method of claim 1, further comprising installing at least one of the transmitting tag and the static beacon at a fixed location, wherein contact records created by the transceiver tag for the at least one of the transmitting tag and the static beacon indicate a distance between the transceiver tag and the fixed location.

6. The method of claim 5, the transceiver tag comprising a visual display and the visual display configured to display information as at least one of text and graphics based on the fixed location indicated by the received beacon signals from the at least one of the transmitting tag and the static beacon installed at the fixed location.

7. The method of claim 6, the transceiver tag further comprising a user input interface that includes at least one of a touch screen, buttons, dials, switches, and voice recognition, the user input interface allowing a user to interact with the information displayed based on the fixed location.

8. The method of claim 1, further comprising using the transmitting tag to mark an asset, such that contact records created by the transceiver tag for the transmitting tag indicate an interaction with the asset.

9. The method of claim 8, the transmitting tag comprising a tamper wire, the transmitting tag configured to perform at least one of sending a tamper alert data packet and actuating an alert mechanism upon detecting damage to the tamper wire.

10. The method of claim 1, further comprising configuring a control tag to send at least one of a disable data packet and an enable data packet to the transceiver tag, the disable data packet configuring the transceiver tag to stop performing at least one of transmitting and receiving beacon signals, the enable data packet configuring the transceiver tag to resume at least one of transmitting and receiving beacon signals.

11. The method of claim 10, wherein the disable data packet configures the transceiver tag to stop at performing at least one of transmitting and receiving beacon signals for a configured period of time.

12. The method of claim 1, further comprising configuring at least one of the gateway and the mobile device to send data packets comprising updated tag operating parameters to the transceiver tag.

13. The method of claim 1, further comprising configuring at least one of the gateway and the mobile device to send data packets comprising a firmware update to the transceiver tag.

14. The method of claim 1, further comprising configuring at least one of the gateway and the mobile device to send data packets comprising additional tag operating parameters configuring the transceiver tag to selectively upload locally stored contact records to the at least one of the gateway and the mobile device, the additional tag operating parameters including at least one of a time since last upload, a minimum contact records stored, and an RSSI contact threshold of the received beacon signal from the at least one of the gateway and the mobile device.

15. The method of claim 1, further comprising:
on condition the smoothed RSSI value of the received beacon signal is at least the RSSI contact threshold:
receiving secondary data from at least one of the mobile device and the gateway, wherein the secondary data includes at least one of GPS coordinates, WiFi network SSID, other devices connected to the WiFI network, WiFi networks scanned, BLE devices scanned, other WiFi data, gyroscope readings, accelerometer readings, barometric pressure readings, and other sensor data; and
including the secondary data in the open contact record.

16. A system comprising:
a transceiver tag, the transceiver tag comprising:
a transceiver configured to transmit and receive beacon signals;
a battery;
a processor; and
a memory storing instructions that, when executed by the processor, configure the transceiver tag to:
transmit a beacon signal, the beacon signal comprising data packets including at least a device ID for the transceiver tag;

receive at least one received beacon signal from at least one of another transceiver tag, a transmitting tag, a gateway, a mobile device, and a static beacon;

maintain a local real-time clock;

determine a received signal strength indicator (RSSI) value for the at least one received beacon signal;

configure the transceiver tag with tag operating parameters, the tag operating parameters configurable and including at least one of:

an advertising interval;
a contact window;
a scan period;
a scan duty cycle;
an RSSI filter threshold; and
an RSSI contact threshold;

on condition the RSSI value of the received beacon signal is below the RSSI filter threshold, ignoring the received beacon signal;

on condition the RSSI value of the received beacon signal is at least the RSSI filter threshold, applying a smoothing filter to the RSSI value to create a smoothed RSSI value;

on condition the smoothed RSSI value of the received beacon signal is at least the RSSI contact threshold:

create an open contact record, the open contact record comprising a received device ID from the data packets of the received beacon signal, the smoothed RSSI value of the received beacon signal, and a first time stamp based on the local real-time clock; and store the open contact record in a local memory;

on condition the smoothed RSSI value of the received beacon signal transitions from at least the RSSI contact threshold to below the RSSI contact threshold:

add a second time stamp, based on the local real-time clock, to the open contact record; and close the open contact record to create a contact record; and upload contact records from the transceiver tag to a cloud server;

at least one of the gateway and the mobile device, the gateway and the mobile device configured to transmit and receive the beacon signals comprising the data packets, configure the tag operating parameters, and upload the contact records logged by the transceiver tag to the cloud server over internet;

the cloud server, the cloud server configured to store and analyze the contact records logged by the transceiver tag.

17. The system of claim 16, wherein data packets received from received from at least one of the other transceiver tag, the gateway, and the mobile device, further comprise a global real-time clock value, and the instructions further configure the transceiver tag to update the local real-time clock with the global real-time clock value.

18. The system of claim 16, wherein the received beacon signals comprise data packets conforming to Bluetooth Low Energy beacon standard protocol.

19. The system of claim 16, the transmitting tag comprising:

a transmitter;
a transmitting tag battery;
a transmitting tag processor; and
a transmitting tag memory.

20. The system of claim 19; the transmitting tag further comprising a tamper wire, wherein the transmitting tag memory further includes instructions that, when executed by the processor, configure the transmitting tag to send an alert upon detecting damage to the tamper wire.

21. The system of claim 16 further comprising a control tag, the control tag configured to transmit a disable data packet, the disable data packet configuring the transceiver tag to stop performing at least one of transmitting and receiving beacon signals.

22. The system of claim 21, the control tag further configured to transmit an enable data packet to the transceiver tag, the enable data packet configuring the transceiver tag to resume performing at least one of transmitting and receiving beacon signals.

23. The system of claim 21, the disable data packet configuring the transceiver tag to stop performing at least one of transmitting and receiving beacon signals for a configured period of time.

24. The system of claim 16, the tag operating parameters further comprising a safe group ID, wherein the transceiver tag is configured to ignore data packets from other tags configured with a same safe group ID.

25. The system of claim 16, the transceiver tag further comprising at least one of an audible alarm, a visual alarm, and a haptic alarm, and, on condition the RSSI value of the received beacon signal is equal to or greater than the RSSI contact threshold, the instructions further configuring the transceiver tag to activate the at least one of the audible alarm, the visual alarm, and the haptic alarm to alert a transceiver tag wearer.

26. The system of claim 25, the transceiver tag further comprising an actuator to deactivate the at least one of the audible alarm, the visual alarm, and the haptic alarm for a configured snooze period.

27. The system of claim 25, the transceiver tag further comprising an actuator to deactivate the at least one of the audible alarm, the visual alarm, and the haptic alarm until the actuator is engaged again.

28. The system of claim 16, the cloud server configured to combine the contact records from at least two transceiver tags indicating mutual contact into a combined contact record.

29. The system of claim 16, the cloud server configured to sum together contact records indicating a contact with a specific other transceiver tag into an accumulated contact duration.

30. The system of claim 16, the instructions further comprising:

on condition the smoothed RSSI value of the received beacon signal is at least the RSSI contact threshold:

receiving secondary data from at least one of the mobile device and the gateway, wherein the secondary data includes at least one of GPS coordinates, WiFi network SSID, other devices connected to the WiFi network, WiFi networks scanned, BLE devices scanned, other WiFi data, gyroscope readings, accelerometer readings, barometric pressure readings, and other sensor data; and including the secondary data in the open contact record.

* * * * *